(12) United States Patent
    Ostadabbas et al.

(10) Patent No.:    US 12,567,173 B2
(45) Date of Patent:        Mar. 3, 2026

(54) INFANT 2D POSE ESTIMATION AND POSTURE DETECTION SYSTEM

(71) Applicant: Northeastern University, Boston, MA (US)

(72) Inventors: Sarah Ostadabbas, Watertown, MA (US); Xiaofei Huang, Lynnfield, MA (US); Nihang Fu, Malden, MA (US); Shuangjun Liu, Boston, MA (US)

(73) Assignee: Northeastern University, Boston, MA (US)

( * ) Notice: Subject to any disclaimer, the term of this patent is extended or adjusted under 35 U.S.C. 154(b) by 183 days.

(21) Appl. No.: 18/287,518

(22) PCT Filed: May 9, 2022

(86) PCT No.: PCT/US2022/028356
    § 371 (c)(1),
    (2) Date: Oct. 19, 2023

(87) PCT Pub. No.: WO2022/236175
    PCT Pub. Date: Nov. 10, 2022

(65) Prior Publication Data
    US 2024/0193809 A1     Jun. 13, 2024

Related U.S. Application Data

(60) Provisional application No. 63/185,435, filed on May 7, 2021.

(51) Int. Cl.
    *G06N 3/08*        (2023.01)
    *G06T 7/73*        (2017.01)
    *G06T 15/04*       (2011.01)
(52) U.S. Cl.
    CPC .................. *G06T 7/74* (2017.01); *G06T 7/75* (2017.01); *G06T 15/04* (2013.01);
    (Continued)

(58) Field of Classification Search
    CPC .. G06T 7/74; G06T 7/75; G06T 15/04; G06T 2207/10016; G06T 2207/10024;
    (Continued)

(56) References Cited

U.S. PATENT DOCUMENTS

| | | | | |
|---|---|---|---|---|
| 8,548,260 B2 * | 10/2013 | Okada | ............... | G06F 18/24323 |
| | | | | 382/226 |
| 9,311,713 B2 * | 4/2016 | Han | ..................... | G06V 40/113 |

(Continued)

FOREIGN PATENT DOCUMENTS

| | | | | | |
|---|---|---|---|---|---|
| WO | WO-2019177732 A1 * | 9/2019 | .......... | G06V 10/774 |
| WO | WO-2020014286 A1 * | 1/2020 | .......... | G06V 10/774 |

(Continued)

OTHER PUBLICATIONS

Ganin et al., "Unsupervised domain adaptation by backpropagation", International conference on machine learning, 11 pages, PMLR, (2015).

(Continued)

*Primary Examiner* — Cheng Yuan Tseng
(74) *Attorney, Agent, or Firm* — Verrill Dana, LLP

(57)            ABSTRACT

Methods are provided for estimating a pose of an infant using image analysis and artificial intelligence. A classifier is trained using a dataset containing hybrid synthetic and real infant pose data. Multi-stage invariant representation machine learning strategies are employed that transfer knowledge from adjacent domains of adult poses and synthetic infant images into a fine-tuned domain-adapted infant pose estimation model.

22 Claims, 13 Drawing Sheets

(52) U.S. Cl.
CPC .............. *G06T 2207/10016* (2013.01); *G06T 2207/10024* (2013.01); *G06T 2207/10028* (2013.01); *G06T 2207/10048* (2013.01); *G06T 2207/20081* (2013.01); *G06T 2207/20084* (2013.01); *G06T 2207/30196* (2013.01)

(58) Field of Classification Search
CPC . G06T 2207/10028; G06T 2207/10048; G06T 2207/20081; G06T 2207/20084; G06T 2207/30196
See application file for complete search history.

(56) References Cited

U.S. PATENT DOCUMENTS

| | | | | |
|---|---|---|---|---|
| 10,429,944 | B2 * | 10/2019 | Hebbalaguppe | ........ G06F 3/017 |
| 10,447,972 | B2 * | 10/2019 | Patil | ........................ G06T 7/246 |
| 10,830,584 | B2 * | 11/2020 | Boulkenafed | ........... G06F 3/017 |
| 10,942,256 | B2 * | 3/2021 | Achour | .................... H01Q 3/36 |
| 11,003,949 | B2 * | 5/2021 | Lan | ........................ G06V 20/41 |
| 11,055,580 | B2 * | 7/2021 | Amon | ................. G06F 18/2431 |
| 11,069,150 | B2 * | 7/2021 | Sminchisescu | ......... G06T 17/20 |
| 11,138,416 | B2 * | 10/2021 | Lin | ......................... G06V 40/23 |
| 11,138,422 | B2 * | 10/2021 | Hu | ....................... G06V 40/113 |
| 11,170,581 | B1 * | 11/2021 | Marek | ................. G06V 10/774 |
| 11,182,620 | B2 * | 11/2021 | Weinzaepfel | .......... G06N 3/045 |
| 11,256,962 | B2 * | 2/2022 | Biswas | ............... G06V 40/103 |
| 11,270,455 | B2 * | 3/2022 | Zhang | .................... G06V 40/23 |
| 11,295,168 | B2 * | 4/2022 | Ye | ......................... G06F 18/214 |
| 11,410,378 | B1 * | 8/2022 | Ghosh | .................. G06T 15/506 |
| 11,501,162 | B2 * | 11/2022 | Karg | ...................... G06F 18/231 |
| 11,501,435 | B2 * | 11/2022 | Xu | ............................. G06T 7/40 |
| 11,568,109 | B2 * | 1/2023 | Rejeb Sfar | .......... G06N 3/0475 |
| 11,568,595 | B2 * | 1/2023 | Logothetis | ............. G06N 3/045 |
| 11,574,198 | B2 * | 2/2023 | Son | ......................... G06N 3/096 |
| 11,704,804 | B2 * | 7/2023 | Abrol | ......................... G06T 7/11 |
| | | | | 382/131 |
| 11,727,086 | B2 * | 8/2023 | Tan | ......................... G06V 20/64 |
| | | | | 382/128 |
| 11,763,541 | B2 * | 9/2023 | Jie | ......................... G06F 18/217 |
| | | | | 382/156 |
| 11,790,228 | B2 * | 10/2023 | Swami | .................... G06V 10/82 |
| | | | | 382/155 |
| 11,842,511 | B2 * | 12/2023 | Sato | ......................... G06V 40/28 |
| 11,937,918 | B2 * | 3/2024 | Otsuki | ................. A61H 1/0262 |
| 11,977,976 | B2 * | 5/2024 | Rejeb Sfar | .......... G06N 3/0475 |
| 12,087,447 | B2 * | 9/2024 | Otsuki | .................... G16H 20/30 |
| 12,141,700 | B2 * | 11/2024 | Murray | .................... G06N 3/08 |
| 12,142,033 | B2 * | 11/2024 | Picon Ruiz | ......... G06V 20/188 |
| 12,148,201 | B2 * | 11/2024 | Kroenke | ................. G06N 3/09 |
| 2008/0180448 | A1 | 7/2008 | Anguelov et al. | |
| 2009/0232353 | A1 | 9/2009 | Sundaresan et al. | |
| 2019/0340803 | A1 | 11/2019 | Comer | |
| 2020/0058137 | A1 | 2/2020 | Pujades et al. | |
| 2020/0134382 | A1 * | 4/2020 | Zhuravlev | ............. G06F 18/217 |
| 2020/0241646 | A1 * | 7/2020 | Hebbalaguppe | ....... G06V 40/20 |
| 2020/0320345 | A1 * | 10/2020 | Nikolenko | ............... G06N 3/08 |
| 2021/0259582 | A1 * | 8/2021 | Matic | .................. A61B 5/0024 |
| 2022/0157048 | A1 * | 5/2022 | Ting | ........................ G06V 10/82 |
| 2022/0269948 | A1 * | 8/2022 | Grigorescu | .......... G06V 10/774 |
| 2023/0169754 | A1 * | 6/2023 | Irie | ......................... G06V 10/82 |
| | | | | 382/224 |

FOREIGN PATENT DOCUMENTS

| | | | | |
|---|---|---|---|---|
| WO | WO-2020103068 | A1 * | 5/2020 | ............. G06V 10/82 |
| WO | WO-2020108362 | A1 * | 6/2020 | ........... G06F 18/214 |
| WO | WO-2020249961 | A1 * | 12/2020 | ............. G06N 3/044 |

OTHER PUBLICATIONS

Huang et al., "Invatiant Representation Learning for Infant Pose Estimation with Small Data", Dec. 2, 2020 (Dec. 2, 2020), [retrieved on Jul. 21, 2022], Retrieved from the Internet: //arxiv.org/pdf/2010.06100v3.pdf pp. 1-12.

Fang et al., "RMPE: Regional Multi-Person Pose Estimation", ICCV, (2017), pp. 1-10.

Hesse et al., "Body Pose Estimation in Depth Images for Infant Motion Analysis", 2017 39th Annual International Conference of the IEEE Engineering in Medicine and Biology Society (EMBC), 4 pages. IEEE, (2017).

Hesse et al., "Computer Vision for Medical Infant Motion Analysis: State of the Art and RGB-D Data Set", Proceedings of the European Conference on Computer Vision (ECCV), 18 pages, (2018).

Hesse et al., "Learning an infant body model from RGB-D data for accurate full body motion analysis", International Conference on Medical Image Computing and Computer-Assisted Intervention, pp. 792-800. Springer, (2018).

Huang et al., "The Devil is in the Details: Delving into Unbiased Data Processing for Human Pose Estimation", The IEEE/CVF Conference on Computer Vision and Pattern Recognition (CVPR), Jun. 2020, pp. 5700-5709.

Liu et al., "A Vision-Based System for In-Bed Posture Tracking", Proceedings of the IEEE International Conference on Computer Vision Workshops, 13 pages, (2017).

Liu et al., "A Semi-Supervised Data Augmentation Approach using 3D Graphical Engines", European Conference on Computer Vision, pp. 395-408, (2018).

Ma et al., "Pose Guided Person Image Generation", Advances in neural information processing systems, 11 pages, (2017).

Rhodin et al., "Unsupervised Geometry-Aware Representation for 3D Human Pose Estimation", Proceedings of the European Conference on Computer Vision (ECCV), 18 pages, (2018).

Su et al., "Render for CNN: Viewpoint Estimation in Images Using CNNs Trained with Rendered 3D Model Views", Proceedings of the IEEE International Conference on Computer Vision, pp. 2686-2694, (2015).

Varol et al., "Learning from Synthetic Humans", Proceedings of the IEEE Conference on Computer Vision and Pattern Recognition, pp. 109-117, (2017).

Vyas et al., "Recognition of Atypical Behavior in Autism Diagnosis From Video Using Pose Estimation Over Time", 2019 IEEE 29th International Workshop on Machine Learning for Signal Processing (MLSP), 6 pages, IEEE, (2019).

Zhang et al., "Distribution-Aware Coordinate Representation for Human Pose Estimation", Proceedings of the IEEE/CVF Conference on Computer Vision and Pattern Recognition, pp. 7093-7102, (2020).

Pavlakos et al., "Expressive Body Capture: 3D Hands, Face, and Body from a Single Image", Proceedings of the IEEE Conference on Computer Vision and Pattern Recognition, pp. 10975-10985, (2019).

Pavllo et al., "3D human pose estimation in video with temporal convolutions and semi-supervised training", Proceedings of the IEEE Conference on Computer Vision and Pattern Recognition, pp. 7753-7762, (2019).

Yu et al., "LSUN: Construction of a Large-Scale Image Dataset using Deep Learning with Humans in the Loop", arXiv preprint arXiv:1506.03365, 9 pages, (2015).

Huang et al., "AH-CoLT: an AI-Human Co-Labeling Toolbox to Augment Efficient Groundtruth Generation", IEEE 29th International Workshop on Machine Learning for Signal Processing (MLSP), 6 pages, IEEE, 2019.

* cited by examiner

*FIG. 6*

INFANT 2D POSE ESTIMATION AND POSTURE DETECTION SYSTEM

CROSS-REFERENCE TO RELATED APPLICATIONS

This application claims priority to U.S. Provisional Application No. 63/185,435, filed on 7 May 2021, which is hereby incorporated by reference in its entirety.

BACKGROUND

Infant motion analysis is important in study and diagnosis of early childhood development. While observing infants, trained experts can assess general movements and postures to predict neurodevelopmental disorders such as cerebral palsy at a very young age, providing critical intervention for affected infants (Hadders-Algra, et al., 1997). Depending on the symptoms and conditions, the observations can take considerable time. Video baby monitors can provide long-term monitoring while providing ample visual data, but expert reviews of the video data and potential follow-up assessments are still required. Computerized human pose estimation has focused on estimations of adult poses. Although the applications of human pose estimations have become increasingly broad, computer models trained on large-scale adult pose datasets are not successful in estimating infant poses. This is largely due to the significant differences between infant and adult body ratios and the larger varieties of infant poses. Privacy and security considerations of infant images hinder the availability of adequate infant images or videos required for training of a robust computer model from scratch.

For infant pose estimation applications that require infant posture/motion analysis, the previous approaches are dominantly based on (real-time or recorded) visual observation by the infant's pediatrician or the use of contact-based inertial sensors. Meanwhile, there exist very few recent attempts initiated by the computer vision community to automatically perform pose estimation and tracking on videos taken from infants. In [Hesse et al., 2017], the authors estimate 3D body pose of infants in depth images for their motion analysis purpose. They employ pixel-wise body part classifier using random ferns to predict 3D joints. The aim of their work was to automate the task of motion analysis to identify infantile motor disorders. In [Hesse et al., 2018b], the authors presented a statistical learning method called 3D skinned multi-infant linear (SMIL) body model using incomplete low quality RGB-D sequence of freely moving infants. The specific dataset they used is provided in [Hesse et al., 2018a], where users map real infant movements to the SMIL model with natural shapes and textures, and generate RGB and depth images with 2D and 3D joint positions. However, both of these works rely heavily on having access to the RGB-D data sequence which is difficult to obtain and hinder the use of these algorithms in regular webcam-based monitoring systems.

Synthesizing complicated articulated 3D models such as a human body has drawn attention due to its extensive applications in studying human poses, gestures, and activities. Among the benefits of synthesizing data is the possibility to automatically generate enough labeled data for supervised learning purposes, especially in small data domains [Su et al., 2015]. In [Liu and Ostadabbas, 2018], the authors introduce a semi-supervised data augmentation approach that can synthesize large-scale labeled pose datasets using 3D graphical engines based on a physically— valid low dimensional pose descriptor. As introduced in [Rhodin et al., 2018], 3D human poses can be reconstructed by learning a geometry-aware body representation from multi-view images without annotations. Another approach in synthesizing human pose images is simulating human figures by employing generative adversarial network (GAN) techniques. The authors in [Ma et al., 2017] present a two-stage pose-guided person generation network to integrate pose by feeding a reference image and a novel pose into a U-Net-like network to generate a coarse reposed person image, and refine the image by training the U-Net-like generator in an adversarial way. In these works, however, neither the generated human avatars nor the reconstructed poses are able to accurately adapt to the infant style. Additionally, these GAN-based approaches of synthetic human figures do not have the capabilities of simulating complicated poses regularly taken by infants.

New systems and methods for estimating and detecting the poses and postures of infants are needed.

SUMMARY

The present technology utilizes a synthetic and real infant pose dataset (termed "SyRIP") with small yet diverse real infant images as well as generated synthetic infant data. A multi-stage invariant representation learning strategy is provided that can transfer the knowledge from the adjacent domains of adult poses and synthetic infant images into a fine-tuned domain-adapted infant pose (FiDIP) estimation model. The technology has been demonstrated to outperform previous state-of-the-art (SOTA) human pose estimation models for an infant pose with a mean average precision (mAP) as high as 90.1.

The technology can be further summarized by the following list of features.

1. A system for estimating a pose of an infant, the system comprising a computer comprising one or more processors and memory and a pose estimator, the pose estimator comprising a trained model for estimating infant poses trained on an adult pose dataset and an augmented dataset containing real infant pose data and synthetic infant pose data using domain adaptation to align features of the synthetic infant pose data with the real infant pose data; and wherein the computer further comprises computer-readable instructions stored in the memory that when executed cause the pose estimator to:
   (a) receive one or more images of an infant using the one or more imaging devices; and
   (b) determine a pose of the infant using the trained model.

2. The system of feature 1 further comprising one or more imaging devices for acquiring images of the infant.

3. The system of feature 1 or feature 2, wherein the trained model is provided by a process comprising:

fitting infant model pose and shape parameters into a real infant image to form a reposed model, the pose and shape parameters including body joints and shape coefficients, the shape coefficients including representations of height, length, fatness, thinness, and head-to-body ratio; and generating synthetic output images.

4. The system of feature 3, wherein the synthetic output images are generated by an imaging process as a function of the pose and shape parameters, imaging device parameters, body texture maps, and background images; wherein the imaging device parameters include principal point and focal length of a camera; and wherein the body texture maps include infant textures from infant clothing images augmented with adult textures from adult clothing images.

5. The system of feature 3 or feature 4, wherein the synthetic output images are augmented by minimizing a cost function, wherein the cost function is a sum of loss terms weighted by imaging device parameters, the loss terms including:

a joint-based data term comprising a distance between groundtruth two dimensional joints and a two dimensional projection of corresponding posed three dimensional joints of the infant model pose for each joint;

a mixture of Gaussian pose priors learned from adult poses;

a shape penalty comprising a distance between a shape prior of the infant model and the shape parameters being optimized; and a pose prior penalizing elbows and knees.

6. The system of any of the preceding features, wherein the pose estimator further comprises:

a pose estimation component comprising a feature extractor and a pose predictor; and a domain confusion component in communication with the pose estimation component to share the feature extractor and including a domain classifier operative to distinguish whether a feature on an input image belongs to a real image or synthetic image.

7. The system of feature 6, wherein the pose estimation component further comprises a residual neural network as an encoder and a pose head estimator as a decoder.

8. The system of feature 6 or feature 7, wherein in a first stage, the domain confusion component is fine-tuned using real infant pose data and synthetic infant pose data, to obtain a domain classifier for predicting whether features of an input image are from a synthetic infant image or a real infant image, using an optimization of a loss function to determine a binary cross entropy loss.

9. The system of feature 8, wherein in the first stage, the pose estimation component is locked.

10. The system of feature 9, wherein in a second stage, the pose estimation component is fine-tuned using the domain classifier to extract body keypoint information independently of differences between a real domain and a synthetic domain.

11. The system of feature 10, wherein in the second stage, the weight of real data and synthetic data is balanced by maximizing a domain loss function, wherein features representing the real domain and features representing the synthetic domain become more similar.

12. The system of any of features 6-11, wherein the feature extractor and the domain classifier are operative to enforce mapping of input images in a real domain or a synthetic domain into a same feature space after feature extraction.

13. The system of any of features 6-12, wherein the domain classifier comprises a binary classifier with three fully connected layers operative to distinguish whether an input feature belongs to a real image or a synthetic image.

14. The system of any of features 6-13, wherein the pose estimation component is pre-trained with real adult data, and the domain confusion component is pre-trained with real adult data and synthetic adult data.

15. The system of any of features 2-14, wherein the one or more imaging devices are selected from the group consisting of a video camera, a motion capture device, a red-green-blue (RGB) camera, a long-wavelength infrared (LWIR) imaging device, and a depth sensor.

16. A method of estimating a pose of an infant comprising:

(a) providing the system of any of the preceding features;

(b) transmitting to the pose estimator one or more images of an infant; and (c) determining a pose or posture of the infant using the pose estimator.

17. The method of feature 16, wherein the system provided in (a) comprises an imaging device, the method further comprising:

(a1) obtaining one or more images of the infant using the imaging device;

wherein the one or more images transmitted in step (b) comprise the one or more images obtained in step (a1).

18. The method of feature 16 or feature 17, wherein the trained model is provided by:

fitting infant model pose and shape parameters into a real infant image to form a reposed model, the parameters including body joints and shape coefficients, the shape coefficients including representations of height, length, fatness, thinness, and head-to-body ratio; and generating synthetic output images, wherein the synthetic output images are generated by an imaging process as a function of the pose and shape parameters, camera parameters, body texture maps, and background images, the camera parameters including camera principal point and focal length, and the body texture maps including infant textures from infant clothing images augmented with adult textures from adult clothing images.

19. The method of feature 18, wherein the synthetic output images are augmented by minimizing a cost function, wherein the cost function is a sum of loss terms weighted by camera parameters, the loss terms including:

a joint-based data term comprising a distance between groundtruth two dimensional joints and a two dimensional projection of corresponding posed three dimensional joints of the infant model pose for each joint;

a mixture of Gaussian pose priors learned from adult poses;

a shape penalty comprising a distance between a shape prior of the infant model and the shape parameters being optimized; and a pose prior penalizing elbows and knees.

20. The method of any of features 16-19, wherein:

the pose estimator comprises:

a pose estimation component including a feature extractor and a pose predictor; and a domain confusion component in communication with the pose estimation component to share the feature extractor and including a domain classifier operative to distinguish whether a feature on an input image belongs to a real image or synthetic image; and wherein the method further comprises:

training the pose estimator in a first stage, wherein the domain confusion component is fine-tuned using real infant pose data and synthetic infant pose data, to obtain a domain classifier for predicting whether features of an input image are from a synthetic infant image or a real infant image, using an optimization of a loss function to determine a binary cross entropy loss;

training the pose estimator in a second stage, wherein the pose estimation component is fine-tuned using the domain classifier to extract body keypoint information independently of differences between a real domain and a synthetic domain; and balancing weights of real data and synthetic data in the second stage by maximizing a domain loss function, wherein features representing the real domain and features representing the synthetic domain become more similar.

21 The method of feature 20, further comprising pre-training the pose estimation component with real adult data, and pre-training the domain confusion component with real adult data and synthetic adult data.

BRIEF DESCRIPTION OF THE DRAWINGS

FIG. 6 shows an illustration of a pipeline for synthetic infant image generation. At left, 3D infant body models are posed by fitting SMIL model pose and shape parameters into real infant images. The generated model is reposed by adding variances to pose coefficients, θ. Then output images are rendered using random background images, texture maps on the body, lighting, and camera positions.

In FIG. 9, column A is the visualization of groundtruth poses, column B (in the surrounding box) is the SimpleBaseline+FiDIP model results. Columns C-J show the results of models ordered based on the in AP accuracy when tested on the SyRIP Test500 dataset. Column C is DarkPose (AP=98.0). Column D is DarkPose (AP=97.7). Column E is SimpleBaseline (AP=97.6). Column F is Dark-Pose (AP=97.4). Colum G is SimpleBaseline (AP=97.3). Column H is DarkPose (AP=95.2). Column I is FasterR-CNN (AP=93.4). Column J is FasterR-CNN (AP=91.9). Incorrect predictions are highlighted by lines overlayed on each image.

DETAILED DESCRIPTION

Figure 1:
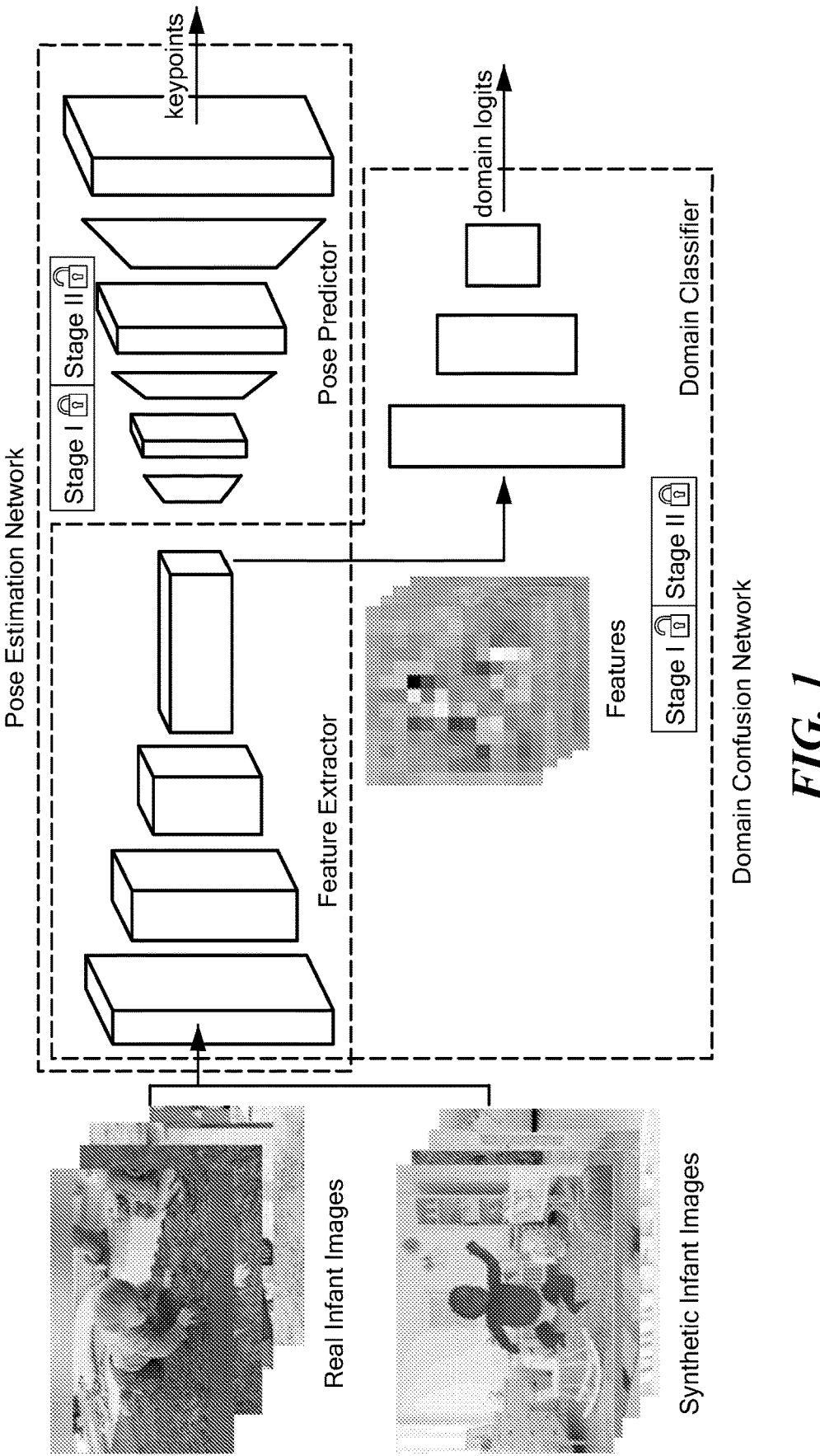
FIG. 1 shows an overview architecture of the FiDIP network, composed of two sub-networks: a pose estimation network, including a feature extractor and a pose predictor, and a domain confusion network, including a domain classifier.

Recent advances in computer vision have led to powerful human activity recognition models; however, models trained on large-scale adult activity datasets have limited success in estimating infant actions/behaviors due to the significant differences in their body ratios, the complexity of infant poses, and types of their activities. More specifically, publicly available large-scale human pose datasets are predominantly comprised of scenes from sports, TV, and other daily activities performed by adult humans, and none of these datasets provides exemplars of activities of young children or infants. Additionally, privacy and security considerations hinder the availability of adequate infant images/videos required for training of a robust model from scratch. Successful mainstream human pose estimation algorithms do not yield accurate estimation results when tested on infant images.

The present technology provides a fine-tuned domain-adapted infant pose (FiDIP) estimation model, that transfers the knowledge of adult poses into estimating infant poses with the supervision of a domain adaptation technique on synthetic and real infant pose (SyRIP) dataset. On the SyRIP test dataset, the FiDIP model outperforms other state-of-the-art human pose estimation model for the infant pose estimation, with the mean average precision (AP) as high as 90.1 on Test100. The implementation of synthetic infant data generation is located under the root path.

To mitigate the data limitation issue and towards developing a robust infant behavior estimation/tracking system, the technology described herein provides a two-stage data efficient infant pose/posture estimation framework bootstrapped on both transfer learning and synthetic data augmentation approaches. The pose—a collection of human joint locations—is a succinct representation of a person's physical state, and a low-dimensional vector required by the pipeline to estimate infant postures, defined as a few particular disposition of body parts with respect to each other and a locomotion surface (e.g. sitting, standing, etc.). In Stage I, the fine-tuned domain-adapted infant pose (FiDIP) estimation approach makes use of an initial pose estimation model trained on the abundant adult pose data, then fine-tunes that model on an augmented dataset containing a small amount of real infant pose data and a series of pose-diverse synthetic infant images. For the augmented dataset, a domain adaptation method is provided to align features of synthetic infant data with the real infant images. In Stage II, using the estimated pose as a low-dimensional representation of each RGB image, a shallow fully connected neural network classifier is trained to estimate the posture of the infant in each video frame. The developed FiDIP-Posture pipeline is very data efficient and trained exclusively on very limited number of infant images scraped from the Internet, which were manually annotated and is called "SyRIP" pose dataset".

The FiDIP-Posture pipeline provides several features and aspects, including the following: (1) Presenting a fine-tuned domain-adapted infant pose (FiDIP) estimation model composed of a pose estimation sub-network to leverage transfer learning from a pre-trained adult pose estimation network and a domain confusion sub-network for adapting the model to both real infant and synthetic infant datasets. (2) Achieving highly accurate and robust end-to-end posture-based-on-pose estimation pipeline, called FiDIP-Posture that is trained with limited posture labels since pose can be seen as a low-dimensional representation for posture learning. (3) Building a synthetic and real infant pose (SyRIP) dataset, which includes in one implementation 700 fully-labeled real infant images in diverse poses as well as 1000 synthetic infant images produced by adopting two different human image generation methods.

The present technology provides a reliable 2D pose estimation model that is particularly adaptive to infants. Currently there exist very few recent attempts initiated by the computer vision community to automatically perform pose estimation and tracking on videos taken from infants. The technology described herein applies data augmentation method (generating plenty of synthetic infant images) to overcome the widespread problem of insufficient training data for infants. The quantitative and qualitative experiments show that the FiDIP model systematically and significantly outperforms the state-of-the-art 2D pose estimation methods. FiDIP-Posture when applied on a fully novel infant dataset in their interactive natural environments can achieve mean average precision (mAP) as high as 86.3 in pose estimation and a classification accuracy of 77.9% for posture recognition.

The technology can be used in a variety of applications, such as baby monitoring, infant motion analysis, infant early motor screening, and infant telehealth visits and tele-rehabilitation for infant motor movement assessment and rehabilitation. Gross motor activities are one of the earliest observable signals of development in infants. Screening for motor delays and administering early intervention can affect infant development in a wide spectrum of domains. Developing a motor activity detector, which is able to automatically track an infant's pose and posture over time and estimate their motor activities from home videos has great impact, especially in telehealth solutions. The technology can be conveniently implemented in many environments using non-contact and unobtrusive ways of collecting data from a simple webcam or an RGB camera.

Current efforts in machine learning, especially with the recent waves of deep learning models introduced in the last decade, have obliterated records for regression and classification tasks that have previously seen only incremental accuracy improvements. However, this performance comes at a large data cost. There are many other applications that would significantly benefit from machine learning-based inferences, where data collection or labeling is expensive and limited. In these domains, which are referred to herein as "Small Data" domains, the challenge is how to learn efficiently with the same performance with less data. One example of these applications with the small data challenges is the problem of infant pose estimation. In infants, long-term monitoring of their poses provide information about their health condition and accurate recognition of these poses can lead to a better early developmental risk assessment and diagnosis [Prechtl, 1990; Hadders-Algra et al., 1997]. Both motor delays and atypical movements are presented in children with cerebral palsy and are risk indicators for autism spectrum disorders [Zwaigenbaum et al., 2013; Vyas et al., 2019].

However, current publicly available human pose datasets are predominantly from scenes such as sports, TV shows, and other daily activities performed by adult human, and none of these datasets provides any specific infants or young children pose images. Beside privacy issues which hamper large-scale data collection from infant and young children populations, infant pose images differ from available adult pose datasets due to the notable differences in their pose distribution compared to the common adult poses collected from surveillance viewpoints [Liu and Ostadabbas, 2017]. These differences are due to infants having shorter limbs and completely different bone to muscle ratio compared to adults. Also, the approximate positions of various body keypoints (which are used for pose estimation) differ significantly between adults and infants. Activities, appearances, and environmental contexts are also different. Successful mainstream human pose estimation algorithms do not yield accurate estimation results when tested on infant images or videos (see Section 5) with either over-prediction or under-prediction of the limb sizes.

Towards building a robust infant pose estimation model, the technology described herein provides a solution by transfer learning from the existing human pose estimation model for general purpose of adults. It includes a hybrid infant dataset combining both real and synthesis and a fine-tuned domain-adapted infant pose (FiDIP) estimation network as shown in FIG. 1, which is a data-efficient inference model bootstrapped based on both transfer learning and synthetic data augmentation approaches. Using these data-efficient invariant representation learning paradigms, the FiDIP model demonstrates superior pose estimation performance when applied on real infant pose images compared to the SOTA general-purpose pose estimation models. The small data problem of infant pose estimation is addressed in the following ways.

A fine-tuned domain-adapted infant pose (FiDIP) model built upon a two-stage training paradigm. In stage I of training, a pre-trained synthetic/real domain confusion network is fine-tuned in a pose-unsupervised manner. In stage II, a pre-trained pose estimation model is fine-tuned under the guidance of stage I-trained domain confusion network. Both networks are updated separately in an iterative way.

Two invariant representation learning goals are achieved. In the FiDIP network, there exist two transfer learning tasks: (1) from adult pose domain into the infant pose domain, and (2) from synthetic image domain into the real image domain.

The pose estimation network is fine-tuned by constraining that to extract features with common domain knowledge between synthetic and real data.

A synthetic and real infant pose (SyRIP) dataset is provided, which in some implementations includes 700 fully-labeled real infant images in diverse poses as well as 1000 synthetic infant images produced by adopting two different human image generation methods.

The technology described herein provides a data-efficient infant pose learning method targeted for small dataset sizes. The produced fine-tuned domain-adapted infant pose (FiDIP) model outperforms the SOTA general pose estimation models, especially on many typical poses for infants (see FIG. 2).

FiDIP: Fine-Tuned Domain-Adapted Infant Pose Estimation

The FiDIP approach makes use of an initial pose estimation model trained on the abundant adult pose data, then fine-tunes that model on an augmented dataset, which contains a small amount of real infant pose data and a series of pose-diverse synthetic infant images. For the augmented dataset, a domain adaptation method is used to align features of synthetic infant data with the real-world infant images. As the number of images in the dataset is limited, only a few layers of that network are updated to fine-tune that for infant pose estimation rather than re-training the whole adult pose estimation network.

Network Architecture Components employed as the building blocks for FiDIP network are shown in FIG. 1. The pose estimation component has a residual neural network such as ResNet-50 backbone [He et al. 2016] (incorporated by reference herein) as the encoder and a pose head estimator from [Xiao et al. 2018] (incorporated by reference herein) as the decoder. A domain confusion network, which is composed of a feature extractor shared with the pose estimation component and a domain classifier, is added to enforce the images in the real or synthetic domain being mapped into a same feature space after feature extraction. The domain classifier is designed to be a binary classifier with only three fully connected layers to distinguish whether the input feature belongs to a real or synthetic image.

The FiDIP network can employ or be integrated with other encoder-decoder pose models. A pose estimation model with feature extractor as its encoder and pose estimator as its decoder can apply the FiDIP framework by introducing a domain classification head. The model can be treated as two sub-networks: a pose estimation network and a domain confusion network. Examples of suitable pose estimation networks include Simple Baseline (Xiao et al. 2018), DarkPose (Zhang et al., 2020), and Hourglass (Newell et al., 2016). The domain confusion network, having a feature extractor shared with the pose estimation component and a domain classifier, can enforce the images in the real or synthetic domain being mapped into a same feature space after feature extraction. The domain confusion network assists the pose estimation network during training.

Network Training

The FiDIP training procedure includes an initialization session and a formal training session where the domain classifier and feature extractor are trained in a circular way.

Model initialization. The pose estimation component of FiDIP network is already pre-trained on adult pose images from COCO dataset [Lin et al., 2014]. Since the training strategy is based on the use of fine-tuning for transfer learning, to avoid unbalanced components' updating during fine-tuning, the domain classifier part of the domain confusion sub-network also needs to be pre-trained on both real and synthetic data from adult humans in advance. This combination dataset includes real adult images from the validation part of COCO dataset and some part of synthetic humans for real (SURREAL) dataset [Varol et al., 2017]. During this pre-training, the feature extractor part stays frozen, and only the weights for domain classifier are initialized.

The following stages are performed after this initialization.

Formal training session. In this session, for each iteration the network is updated in a circular way with two stages.

Stage I. In this stage, the pose estimation sub-network is locked and the domain classifier of the domain confusion subnetwork is fine-tuned based on the current performance of feature extractor using infant real and synthetic pose data. The objective of this stage is to obtain a domain classifier for predicting whether the features are from a synthetic infant image or real one. Since the pose estimation network is locked and only the domain classifier is to be optimized, the optimization objective in this stage is the loss of domain classifier $L_D$, which is calculated by the binary cross entropy:

$$L_D = -\frac{1}{N}\sum_{i=1}^{N} d_i \cdot \log f(s_i) + (1 - d_i)\cdot \log(1 - f(s_i)) \tag{1}$$

where $s_i$ is the score of ith feature belonging to synthetic domain, $d$, is the corresponding groundtruth, $f(\cdot)$ represents the sigmoid function, and N is the batch size.

Stage II. The pose estimation network is to be fine-tuned with locked domain classifier in this stage. The technology tries to refine the feature extractor to not only affect the pose predictor but also confuse the domain classifier. The domain classifier updated at stage I is leveraged, to promote the feature extractor to retain the ability to extract keypoints' information during the fine-tuning process, but also to ignore the differences between the real domain and the synthetic domain. An adversarial training method, such as that in [Ganin and Lempitsky, 2015] (incorporated by reference herein), can be utilized to push features from synthetic images and real images into a common domain. A gradient reversal layer (GRL) can be introduced to minimize the pose loss ($L_P$).

Additionally, high volume synthetic data raises a data balancing issue. Many more synthetic images are employed during each training session compared to the real images. To address this issue, a balancing strategy is provided by increasing the weight of real data during training. The $L_P$ loss, which measures the mean squared error between predicted heatmap $\hat{y}_i$ and targeted heatmap $y_i$ for each keypoint i, is:

$$L_P = \frac{1}{N}\sum_{i=1}^{N} S(I_i)(\hat{y}_i - y_i)^2 \tag{2}$$

where S(Ii) is the scaling factor in the domain indicator $I_i$. It simultaneously maximizes the domain loss ($L_D$), so that the features representing both synthetic and real domains become similar. The optimization objective is:

$$L(\theta_f,\theta_y,\theta_d)=L_P(\theta_f,\theta_y)-\lambda L_D(\theta_f,\theta_d) \tag{3}$$

where $\lambda$ controls the trade-off between the two losses that shape the features during fine-tuning. $\theta_f$, $\theta_y$, and $\theta_d$ represent parameters of feature extractor, pose predictor, and domain classifier, respectively.

Synthetic/Real Infant Pose Dataset (SyRIP)

Figure 3A:
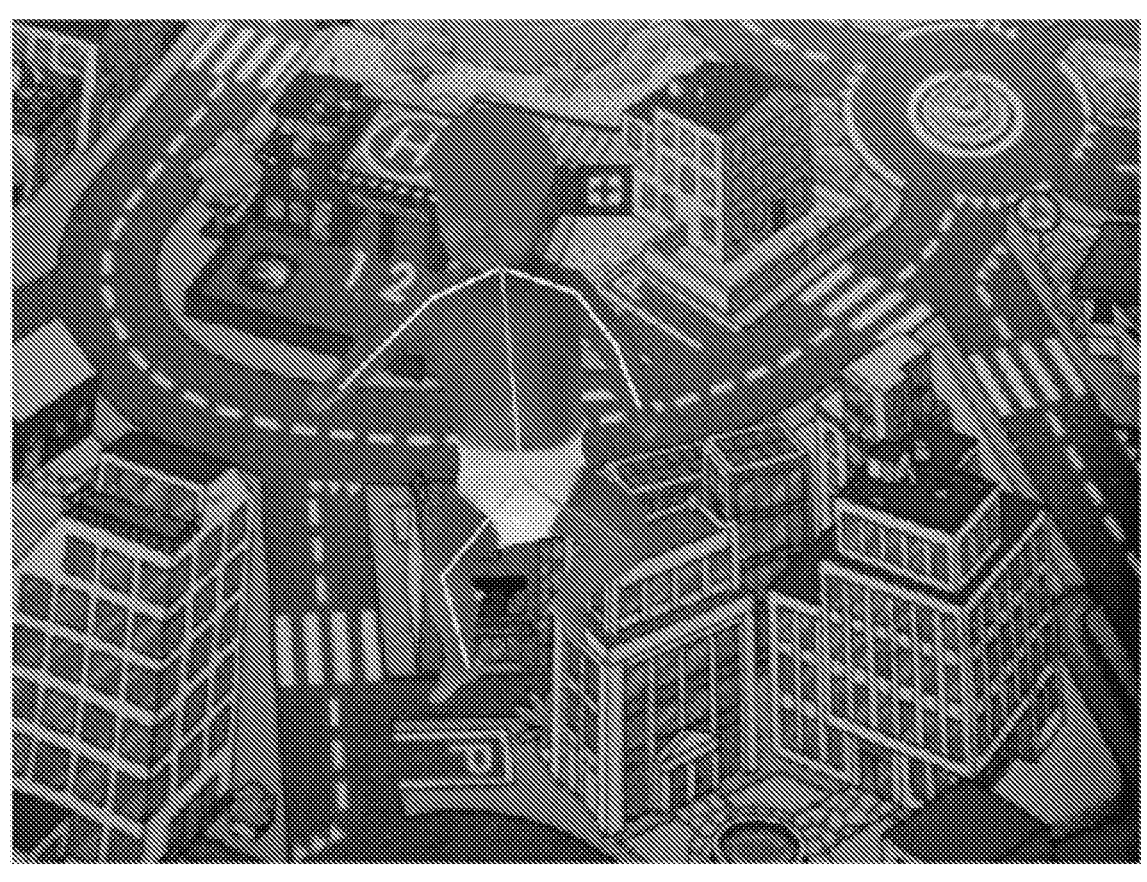
FIG. 3A shows a sample image (top) and pose distributions (bottom) of the MINI-RGBD dataset.
Figure 3A:
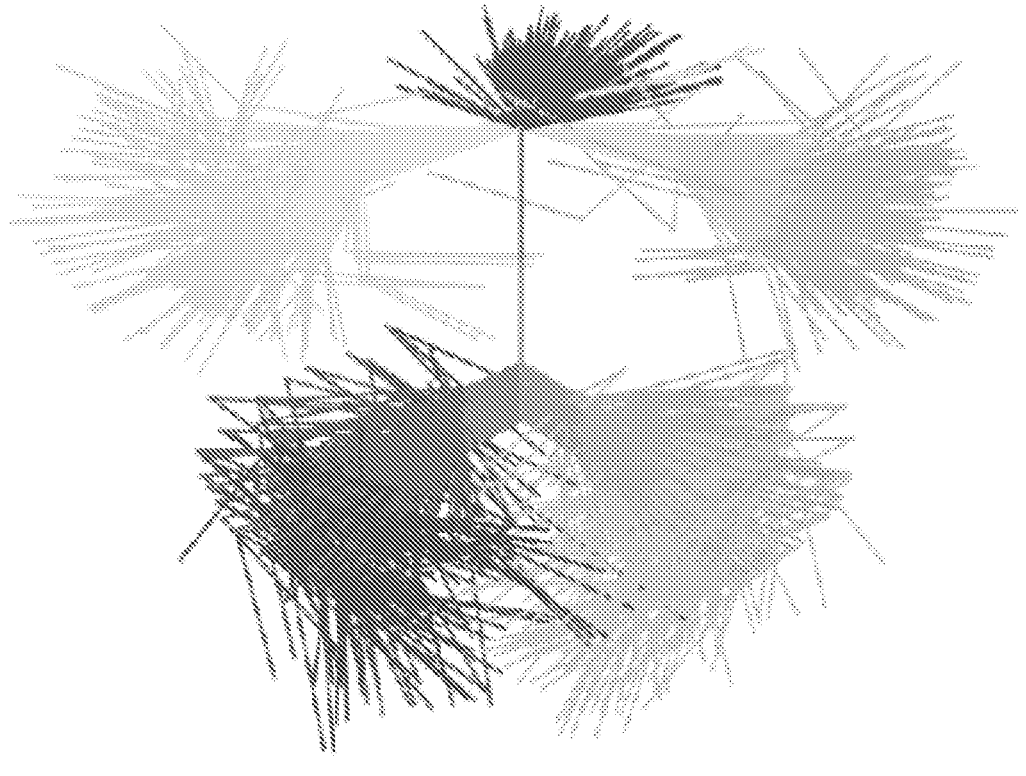

As stated earlier, there is a shortage of labeled infant pose datasets, and despite recent efforts in developing them, a versatile dataset with different and complex poses to train a deep network on is yet to be built. The only publicly-available infant image dataset is MINI-RGBD dataset [Hesse et al., 2018a], which provides only 12 synthetic infant models with continuous pose sequences. However, besides having simple poses, MINI-RGBD sequential feature leads to a small variation in the poses between adjacent frames and the poses of the whole dataset are mainly repeated. In FIG. 3A, the distribution of body poses of MINI-RGBD dataset is shown and the poses in this dataset are observed to be relatively consistent. Both simplicity and synthetic would cause the pose estimation models trained on MINI-RGBD to not generalize well to real-world infant poses.

To address this limitation, a new infant pose dataset is built including both real and synthetic images that display infants in various positions, and it is utilized to train a robust FiDIP model. The synthetic and real infant pose (SyRIP) dataset includes a training part containing 200 real and 1000 synthetic infant images, and a test part with 500 real infant images, all with fully 2D annotated body joints. Infants in these images have many different poses, like crawling, lying, sitting, and so on. The real images all come from YouTube videos and Google Images, and the synthetic infant images are generated based on the 3D SMIL body model that are from the real images with known 2D pose ground truth and synthetic animation from Blender.

Real Pose Data Gathering

Due to difficulty in controlling infant movements as well as privacy concerns, access to infant images with various poses is limited. Therefore, for the real portion of the SyRIP dataset, publicly available yet scattered real infant images are obtained from sources such as YouTube and Google Images. The biggest benefit of this collection method is that the diversity of infant poses is guaranteed to the greatest extent. Infants (newborn to one year old) in various poses and many different backgrounds are chosen.

In one implementation, YouTube was manually queried and more than 40 videos with different infants downloaded, and then each video sequence was split to pick about 12 frames containing different poses. Finally, about 500 images including more than 50 infants with different poses from those frames were collected. About 200 high-resolution images containing more than 90 infants from Google Images were also selected. Compared to the images taken from the YouTube videos, images from Google Images with higher resolution can be used to improve the quality of the whole dataset. The pose distribution of the real part of the SyRIP dataset is shown in the FIG. 3B (bottom). It can be seen that these poses are more diverse than those in the MINI-RGBD dataset shown in FIG. 3A (bottom).

Synthetic Data Augmentation

On the one hand, it is almost impossible to train a deep neural network from scratch or even fine-tune it using just 200 real images. On the other hand, it is challenging to find more real infant images with different poses online. Therefore, synthetic infant images were generated to expand the dataset.

In order to get plenty of synthetic infant images with manifold poses, two approaches are utilized to generate synthetic images. One is directly generating individual images by fitting 3D skinned multi-infant linear (SMIL) body model [Hesse et al., 2018b]. The other approach is extracting several frames from a synthetic 3D infant animation created in the Blender software.

In one implementation, 950 synthetic infant images were generated by fitting SMIL model and 50 images were generated with high resolution using Blender to expand the synthetic training portion of SyRIP dataset. The pose distribution of this synthetic subset is also visualized in FIG. 3C (bottom), to make sure that the poses in the synthetic dataset have enough variations as well.

Figure 6:
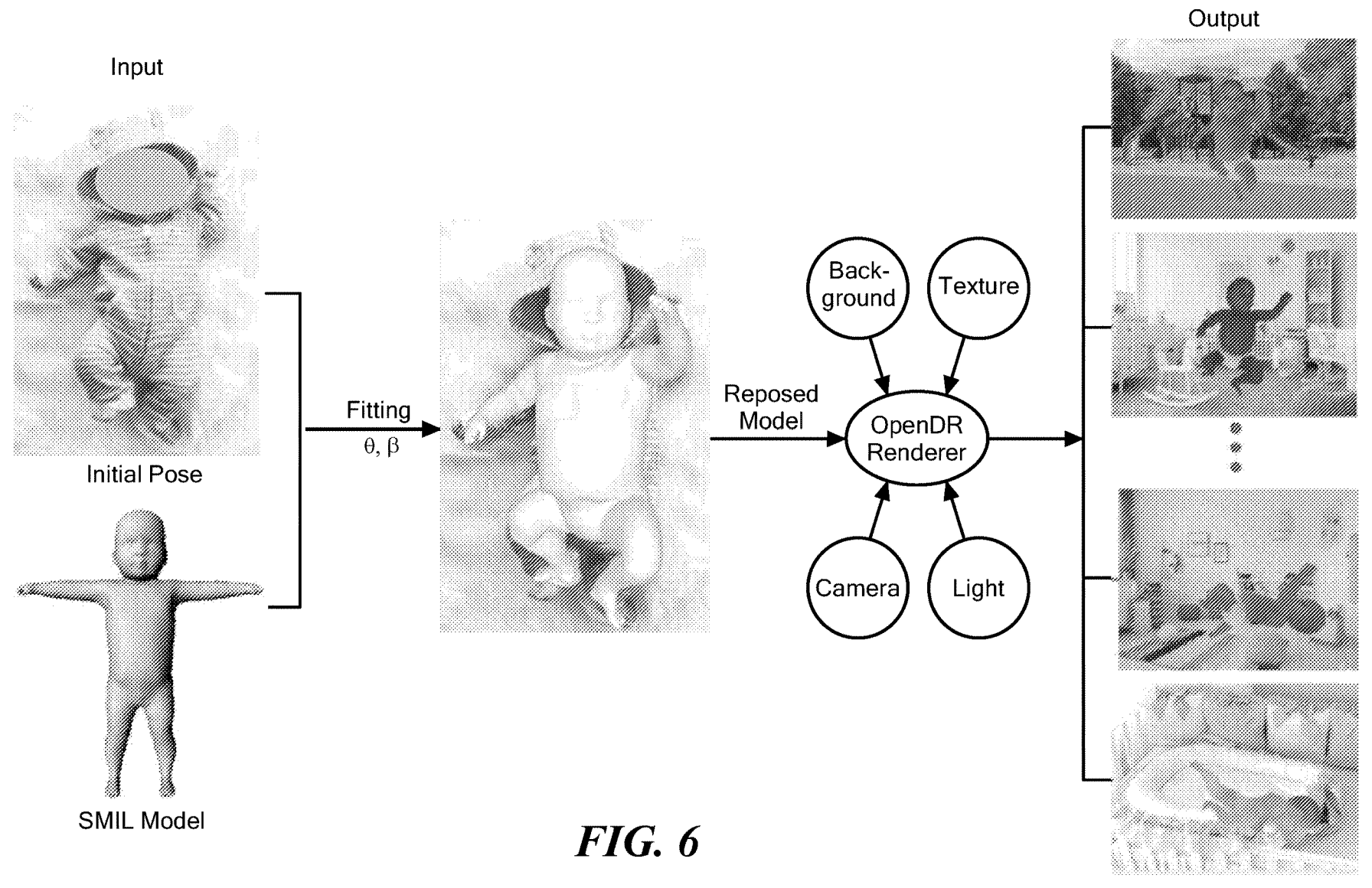

Regarding the SMIL model, a 3D skinned multi-infant linear (SMIL) body model [Hesse et al., 2018] can be utilized to generate synthetic infant images. For SURREAL generation, images can be rendered from the synthetic adult bodies created by using a skinned multi-person linear (SMPL) body model, whose parameters can be fitted by the MoSh method given raw 3D MoCap marker data. What differentiates the method herein from SURREAL is using the body model of an infant (i.e. SMIL model), instead of the adult body model, as well as applying SMPLify-X method of [Pavlakos et al., 2019] (incorporated herein by reference) to generate SMIL model parameters. The pipeline of synthetic infant data generation is illustrated in FIG. 6.

In one example, SMIL model has $N=6890$ vertices and $K=23$ joints, and can be parameterized by the pose coefficients $\theta \in \mathbb{R}^{3(K+1)}$ where $K+1$ stands for body joints and one more joint (pelvis, is the root of the kinematic tree) for global rotation, and the shape coefficients $\beta \in \mathbb{R}^{20}$ representing the proportions of the individual's height, length, fat, thin, and head-to-body ratio.

The SMIL model can be employed for synthetic body pose data generation, which can be parameterized by the pose coefficients $\theta$, and the shape coefficients $\beta$, representing the proportions of the individual's height, length, body shape, and head-to-body ratio. The infant mesh is then given as $M(\beta, \theta)$ and a synthetic image $I_{syn}$ can be generated through a suitable imaging process with the infant mesh, intrinsic camera parameters (which can be augmented with a random position with a fixed focal length), texture, and background maps as inputs. The imaging process can be, for example, $$I_{syn} = \mathcal{J}(M(\beta,\theta),C(d,f),Tx,Bg),$$

where $C$ represents the camera parameters depending on the camera principal point d and focal length f. Tx stands for the texture and Bg stands for the background. The camera parameter can be augmented with a random position with a fixed focal length.

SMIL provides only limited appearances and simple pose parameters. There are neither known infant motion capture data nor extra infant appearances for the SMIL model. To augment these parameters, references from neighboring domains can be employed.

For example, in one implementation, the SMPLify-x approach described in [Pavlakos et al., 2019] (incorporated herein by reference) can be employed to lift the obtained 2D poses into the SMIL pose by minimizing a cost function. More particularly, to fit SMIL model's pose and shape to the pose of real infant images (skeletons), minimize an objective function including four loss terms: (1) $L_J$ a joint-based data term, which is the distance between groundtruth 2D joints $j_{2D}$ and the 2D projection of the corresponding posed 3D joints of SMIL for each joint, (2) $L_\theta$ defined as a mixture of Gaussians pose prior learnt from 37,000 poses, (3) a shape penalty $L_\beta$, which is the Mahalanobis distance between the shape prior of SMIL and the shape parameters being optimized, and (4) a pose prior penalizing elbows and knees $L_\alpha$.

$$L_{all} = L_J(\beta,\theta;C,j_{2D}) + \lambda_\theta L_\theta(\theta) + \lambda_\beta L_\beta(\beta) + \lambda_\alpha L_\alpha(\theta),$$

where C is intrinsic camera parameters, $\lambda_\theta$, $\lambda_\beta$, and $\lambda_\alpha$ are weights for specific loss terms, as described in [Pavlakos et al., 2019]. In this manner, they synthetic infant pose and shape can be augmented via learned parameters from the real images.

For generating images using SMIL model, as shown in FIG. 6, 150 various poses/skeletons can be randomly selected from the annotated real subset as initial poses. The synthetic infant bodies can be generated by applying the approach described above to fit SMIL model to these initial poses. In order to make the dataset as diverse as possible, generated infant bodies can be rendered with random textures/clothes and random backgrounds from different viewpoints with some different lights. Since there are very few infant texture resources, to enhance the appearance variance, besides the available 12 infant textures (naked only with diaper) provided by MINI-RGBD dataset, the infant model can be further augmented with adult textures. In one implementation, adult textures were obtained from 478 male and 452 female clothing images coming from SURREAL dataset. For the background, 600 scenarios approximately related to infant indoor and outdoor activities were chosen from LSUN dataset [Yu et al., 2015]. For each initial pose, 10 synthetic images were generated with different global rotations. However, not all poses were fitted correctly. They were manually filtered out and 950 good quality synthetic infant images were finally retained (samples are shown in 2nd column of FIG. 7) with 480×640 resolution as a part of the synthetic subset.

During synthesizing, unnatural or invalid generated infant bodies can be manually filtered out and a random noise term can be added into the augmented pose data to further increase the pose variance. The pose distribution of the synthetic data subset, as in FIG. 3C, can be visualized to ensure that the poses in the synthetic dataset contain enough variations.

Additionally, as noted above, another synthetic data augmentation approach can be leveraged to synthesize some high resolution images (1920×1080) using Blender software. Some videos can be obtained, for example, from YouTube, and then Facebook's 2019 VideoPose3D estimator [Pavllo et al., 2019] can be adopted to extract pose information of these videos. This 3D information can be employed to make bones of a 3D infant scan to follow the natural body movements of real infants. By using the animation video generated in Blender, a series of images can be generated and select synthetic images can be selected from them. As limitation of the finite model and texture, just one model with one texture has been used to generated 50 images with different poses and background under the different number of lights. Some snapshots from a sample video are shown in last column of FIG. 7.

In this manner, an infant pose dataset, with synthetic and real infant poses (SyRIP), can be built up including both real and synthetic images that display infants in various positions. This dataset can be used to train pose estimation models, including with the FiDIP method described herein.

Pose Data Annotation

As infant poses are too difficult to distinguish, exclusive manual annotation is very time-consuming. AI-human co-labeling toolbox (AH-CoLT) [Huang et al., 2019] (incorporated by reference) was applied to annotate the SyRIP dataset in COCO fashion. This toolbox provides an efficient and augmentative annotation tool to facilitate creating large labeled visual datasets with accurate ground truth labeling by incorporating the outcomes of AI pose estimators into time-efficient human-based review and revise processes.

The whole process of AH-COLT can be divided into the three steps of AI labeling, human review, and human revision. First, a set of images as the unlabeled data source is chosen and an already trained Faster R-CNN network as the AI labeler is used to get the initial annotation results and store them in a pickle file. Even though Faster R-CNN gives high accuracy results on adult poses, its annotation outcomes on infant poses are not fully accurate. Therefore, the second step, human review, is required. In this step, AI results can be reviewed and each joint can be clicked on to mark whether it is an error or correct. After that, the other pickle file that contains all information of all joints (their coordinates, whether they are visible and whether they are correct) is obtained. Finally, using the human reviser interface, a human revises those error joints and click the correct points as the new right joints.

Semantic Consistency Alignment

During learning from labeled source data due to the gap between the target (i.e., domain-specific) and source (i.e., domain-adjacent) data distributions, the trained model tends to learn details only present in the source domain data and fails to generalize well on target domain data. For the infant pose estimation problem, the two data adjacent domains are (1) adult pose data, and (2) synthetic pose data, which both have different distributions from the real infant pose data. Accordingly, the concept of semantic consistency alignment and complementary domain learning can be extended into the problem of 3D infant pose estimation, by uniting available real 2D pose data with the synthetic pose data.

More particularly, when utilizing synthetic data, the major misalignment introduced into the feature space comes from the unnatural synthetic appearances. Such domain shift issues can be addressed, for example, to adapt two datasets A and B for a common task network T, by forming a feature extractor network G. Adaptation can be set at any layer during feature extraction, and the G network can be broken into multiple stages. As an example, the G network can be divided into two stages as G1 and G2, while adapting shared features at the G1 output. This can map two datasets into a common feature space by, for example, minimizing a predefined distance measure function. Such distance measures are usually based on the statistics of overall feature maps or local patches, uniformly. However, semantic meaning has rarely been reflected in these distance measures; thus the adaptation method based on them cannot always achieve a semantically correct alignment or even could lead to adversary effect when it is mismatched. To emphasize the underlying semantic meaning in the domain adaptation process, provided herein is a semantic distance idea and a complementary learning with shared semantics approach.

The overall distance between domains can be shortened by aligning nearest neighbored patterns to blur their domain identities; however, it may be possible that well-aligned patterns come out to hold different semantic meanings. Thus, the adaptation process can emphasize such semantic distance measure to more effectively achieve alignment is to align the semantic entities to their correct counterparts.

In the case of infant 3D pose estimation, when no 3D body pose and facial landmarks are available, it is useful to make use of the easier to collect/label real 2D pose data and the generated synthetic 3D pose data. Each human joint coordinate can be further divided into 3D part and 2D part, where they always share a common ancestor, the specific body joint. Such a relationship suggests these properties are actually strong "co-consistent". By training on strong co-consistent properties, the features related to the major task will also be strongly related to the complementary properties. In this case, semantic awareness can be enforced by jointly training on the 2D complementary parts.

In this manner, an infant pose dataset, with synthetic and real infant poses (SyRIP), can be built up including both real and synthetic images that display infants in various positions. This dataset can be used to train pose estimation models, including with the FiDIP method described herein.

The system described herein can be implemented as or can include a computer device that includes a combination of hardware, software, and firmware that allows the computing device to run an applications layer or otherwise perform various processing tasks. Computing devices can include without limitation personal computers, work stations, servers, laptop computers, tablet computers, mobile devices, wireless devices, smartphones, wearable devices, embedded devices, microprocessor-based devices, micro-controller-based devices, programmable consumer electronics, mini-computers, main frame computers, and the like and combinations thereof.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit boards, or whether distributed over separated circuitry, housings, or circuit boards, and can include a transmitter-receiver.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (Saas), infrastructure as a service (IaaS), platform as a service (PaaS), network as a service (NaaS), data as a service (DaaS), database as a service (DBaaS), desktop as a services (DaaS), backend as a service (BaaS), test environment as a service (TEaaS), API as a service (APIaaS), and integration platform as a service (IPaaS).

The computer system can be implemented with a baby monitoring system. A baby monitoring system can include one or more imaging device, such as a video camera, a motion capture device, a red-green-blue (RGB) camera, a long-wavelength infrared (LWIR) imaging device, and a depth sensor.

Experimental Evaluation

Training and Test Datasets

The training dataset is divided into a pre-training dataset for the model initialization and a stage training dataset for fine-tuning of the Stage I and Stage II. The pre-training dataset with only real/synthetic labels contains 1904 samples from COCO Val2017 dataset and 2000 synthetic adult images from SURREAL dataset. As introduced above, a SyRIP dataset is created by purposefully collecting 700 online infant images, with as different poses as possible, and expanding this small dataset by adding 1000 synthetic infant images into it. The training part of the SyRIP dataset (including 200 real and 1000 synthetic infant images) with pose and domain annotations is the stage training dataset.

conditions, obtaining a sufficient amount of infant pose images (that can be publicly accessible) is an ongoing challenge, which makes this application a clear example in "Small Data" domain. The lack of data scale is made up for by enriching the poses, characters, and scenes in the SyRIP dataset.

Implementation Details

Pose-ResNet [Xiao et al. 2018] serves as the pose estimation sub-network of FiDIP, and behind its feature extraction layers (ResNet-50) connects a domain classifier, which is a binary classifier with only 3 fully connected layers. When training FiDIP, an Adam optimizer was adopted with learning rate of 0.001, but different batch sizes and epochs. The batch size and epoch for the initialization session was 128 and 10, respectively. For the formal training session, there were 40 epochs and 64 images in a batch. During the Stage II, GRL parameter $\lambda$ was set as 0.0005, and the first four layers (Res1, Res2, Res3, and Res4) of the feature extractor were frozen.

Pose Estimation Performance

An evaluation of SyRIP was conducted. The SyRIP quality is gauged by specifically evaluating the effect of its synthetic data as well as its real and synthetic hybrid data. In a straightforward way, a comparison of identical models fine-tuned on SyRIP or MINI-RGBD datasets is done to compare their performances as shown below in Table 1. Table 1 shows a performance comparison of three SOTA pose estimation models (SimpleBaseline, DarkPose, Pose-MobileNet) fine-tuned on MINI-RGBD, SyRIP-syn (synthesized data only) and SyRIP whole set and then tested on SyRIP Test100.

TABLE 1

| Performance comparison of SOTA pose estimation models. | | | | | | | | | |
|---|---|---|---|---|---|---|---|---|---|
| Train Set | Method | Backbone | Input size | AP | AP50 | AP75 | AR | AR50 | AR75 |
| MINI-RGBD | SimpleBaseline | ResNet-50 | 384 × 288 | 69.2 | 95.8 | 78.0 | 72.4 | 97.0 | 81.0 |
| SyRIP-syn | | | | 85.3 | 97.1 | 91.8 | 87.4 | 98.0 | 93.0 |
| SyRIP | | | | 90.1 | 98.5 | 97.2 | 91.6 | 99.0 | 98.0 |
| MINI-RGBD | DarKPose | HRNet-W48 | 384 × 288 | 85.2 | 98.6 | 95.3 | 87.0 | 99.0 | 96.0 |
| SyRIP-syn | | | | 91.4 | 98.5 | 98.5 | 92.7 | 99.0 | 99.0 |
| SyRIP | | | | 92.7 | 98.5 | 98.5 | 93.9 | 99.0 | 99.0 |
| MINI-RGBD | Pose-MobileNet | MobileNetV2 | 224 × 224 | 12.3 | 38.1 | 3.8 | 21.6 | 52.0 | 14.0 |
| SyRIP-syn | | | | 60.3 | 91.1 | 62.7 | 68.4 | 95.0 | 72.0 |
| SyRIP | | | | 78.9 | 97.2 | 90.6 | 84.2 | 98.0 | 94.0 |

Best AP for each method is highlighted in bold font.

Figure 7:
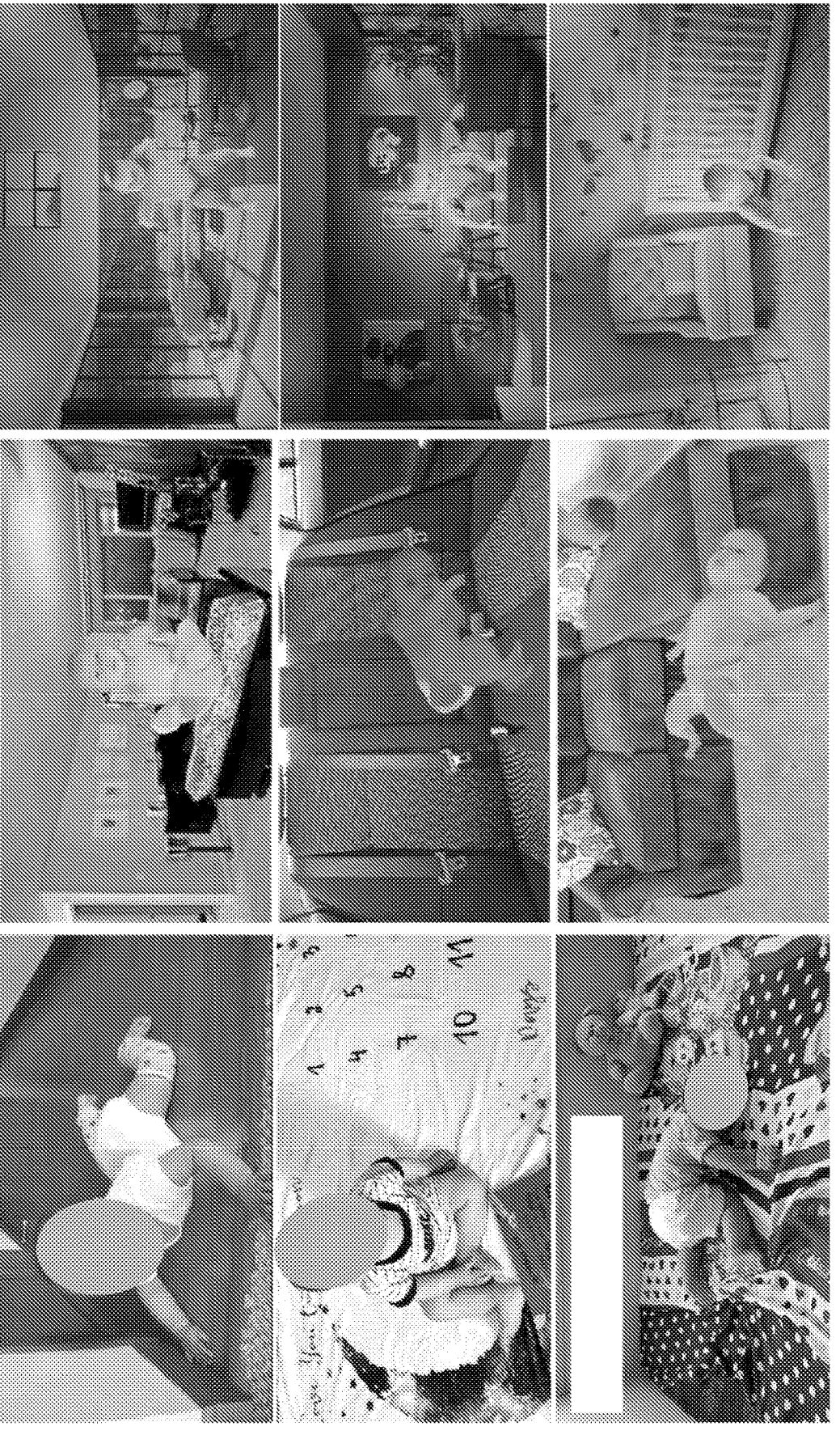
FIG. 7 illustrates images in the SyRIP dataset including (1) left column are real images collected from the internet, (2) middle column are synthetic images generated by using the SMIL model, and (3) right column are synthetic images created in Blender.

Consider that the purpose is to generate a robust infant pose estimator, which is not only able to detect common poses, but also able to handle difficult poses, which rarely appear in adult images or are even difficult to be recognized by human eyes. Therefore, a general test dataset (Test500) is created including 500 real infant images and 100 images extracted with more complex poses from Test500 as a typical infant pose test dataset (Test100) as well. Most of the infant poses are very different from those of adults. Especially because of the baby's softer body, the folded poses and occluded joints are more difficult to be recognized or predicted. Some of these typical poses selected from the SyRIP Test100 (complex poses collection) are shown in FIG. 7. The performance of the FiDIP network was demonstrated by conducting comparative experiments on both of these two test datasets.

It is clear that the number of images in the test set is much smaller compared to the datasets used in other human pose estimation studies. Indeed, due to the aforementioned limitations caused by privacy, security, and other objective From the results in Table 1, it can be seen that with limited synthesized appearances and limited poses, the model tuned on MINI-RGBD is easily overfitted with even lower performance than the original model. In comparison, in the CDIA approach by extensively learning from neighboring domains, the data variation was increased and even with the synthetic infant data alone, SyRIP-syn, and without any adaptation, the model performance was still improved. Additional real infant data, as in the full SyRIP set, further increases the performance, indicating the benefit of the hybrid strategy. All these improvements were observed on all tested models with varying computational complexities.

The pose estimation performance of FiDIP on SyRIP test datasets (Test500 and Test100) and COCO Val2017 dataset were evaluated, and the performance was compared with the widely-used pose estimation models based on Faster R-CNN [Wu et al., 2019], DarkPose [Zhang et al., 2020], Pose-ResNet [Xiao et al., 2018], Unbiased Data Processing for Human Pose Estimation [Huang et al., 2020], and Regional Multi-Person Pose Estimation [Fang et al., 2017] algorithms, as listed in Table 1. The mean average precision (mAP) over 10 thresholds of the object keypoint similarity (OKS), which is the distance between predicted keypoints and ground truth keypoints normalized by the scale of the person, is applied as the pose evaluation metric. As can be seen, all models are well-performed on SyRIP Test500, which contains more common poses, while on the infant typical pose subset, SyRIP Test100, their performances are apparently different. Hence, a focus was on evaluating FiDIP model on SyRIP Test100 dataset for infant specific poses.

An evaluation over FiDIP was conducted as follows. For the infant pose estimation problem, two hypotheses were assumed: (1) 2D human pose estimation models trained on the large-scale public datasets are universally effective on different subjects, including infants. (2) If not, they can be fine-tuned with a few samples from the target domain to achieve high performance. These hypotheses were evaluated by comparing: (a) FiDIP with SOTA pre-trained models; (b)

improved significantly via the FiDIP approach. The pose estimation performance of FiDIP on SyRIP test datasets (Test500 and Test100) and COCO Val2017 dataset are evaluated in Table 2, and the performances are compared with the widely-used pose estimation models based on Faster R-CNN ([24], Wu, et al., 2019), DarkPose ([27], Zhang, et al., 2020), SimpleBaseline ([25], Xiao, et al., 2018), Unbiased Data Processing for Human Pose Estimation ([9], Huang, et al., 2020), and Regional Multi-Person Pose Estimation ([3], Fang, et al., 2017) algorithms, as listed in Table 2. The mean average precision (mAP) over 10 thresholds of the object keypoint similarity (OKS), which is the distance between predicted keypoints and groundtruth keypoints normalized by the scale of the person, is applied as the pose evaluation metric. As can be seen, all models are well-performed on SyRIP Test500, which contains more common poses, while on the infant typical pose subset, SyRIP Test100, their performances are apparently different. Hence, a focus is on evaluating the FiDIP model on SyRIP Test100 dataset for infant specific poses.

TABLE 2

Performance comparison between FiDIP network and the SOTA pose estimators on the COCO Val2017 and SyRIP test datasets.

| Pose Estimation Model | Backbone Network | Input Image Size | COCO_ Val2017 AP | SyRIP_ Test500 AP | SyRIP_Test100 | | | | | |
|---|---|---|---|---|---|---|---|---|---|---|
| | | | | | AP | AP50 | AP75 | AR | AR50 | AR75 |
| Faster R-CNN Wu et al. [2019] | ResNet-50-FPN | Flexible | 65.5 | 93.4 | 70.1 | 97.7 | 73.8 | — | — | — |
| Faster R-CNN Wu et al. [2019] | ResNet-101-FPN | Flexible | 66.1 | 91.9 | 64.4 | 95.2 | 71.5 | — | — | — |
| DarkPose Zhang et al. [2020] | ResNet-50 | 128 × 96 | 64.5 | 95.2 | 65.9 | 94.8 | 66.7 | 69.2 | 96.0 | 71.0 |
| DarkPose Zhang et al. [2020] | HRNet-W48 | 128 × 96 | 74.2 | 97.4 | 82.1 | 98.6 | 92.2 | 83.6 | 99.0 | 93.0 |
| DarkPose Zhang et al. [2020] | HRNet-W32 | 256 × 192 | 77.9 | 97.7 | 88.5 | 98.4 | 98.4 | 90.1 | 99.0 | 99.0 |
| DarkPose Zhang et al. [2020] | HRNet-W48 | 384 × 288 | 79.2 | 98.0 | 88.4 | 98.5 | 98.5 | 90.0 | 99.0 | 99.0 |
| Pose-ResNet Xiao et al. [2018] | ResNet-50 | 256 × 192 | 72.4 | 97.3 | 80.4 | 98.5 | 92.2 | 82.5 | 99.0 | 94.0 |
| Pose-ResNet Xiao et al. [2018] | ResNet-50 | 384 × 288 | 72.3 | 97.5 | 82.4 | 98.8 | 92.2 | 83.8 | 99.0 | 93.0 |
| RMPE Fang et al. [2017] | VGG_SSD | 500 × 500 | 61.8 | 76.2 | 76.3 | 82.4 | 78.3 | — | — | — |
| UDP Huang et al. [2020] | HRNet-W32 | 256 × 192 | 74.4 | 81.2 | 79.8 | 86.2 | 88.4 | 71.3 | 73.2 | 74.0 |
| UDP + Pose-ResNet Huang et al. [2020] | ResNet-50 | 256 × 192 | 70.4 | 83.4 | 78.2 | 80.2 | 77.4 | 75.1 | 75.4 | 76.7 |
| UDP + Pose-ResNet Huang et al. [2020] | ResNet-152 | 384 × 288 | 74.3 | 84.2 | 79.1 | 81.5 | 82.8 | 81.1 | 80.4 | 79.6 |
| FiDIP (Ours) | ResNet-50 | 384 × 288 | 66.1 | 98.2 | 90.1 | 98.5 | 97.3 | 91.5 | 99.0 | 98.0 |

Best results are highlighted in bold fonts.

FiDIP ablation study; (c) FiDIP with conventional fine-tuning approach. For fair comparison, all models can be trained on SyRIP if needed and the performance advantage purely comes from the approaches.

A comparison with the SOTA general purpose pose estimation models was conducted as follows. The FiDIP model was compared with a ResNet-50 of SimpleBaseline (SimpleBaseline-50) backbone (Xiao, et al., 2018) with pre-trained SOTA approaches as described below in Table 2. Most models are well-performed on SyRIP Test500, which indicates infants and adults share many common poses. However, for infant-specific poses in Test100, their performance drops dramatically, as these poses are rarely seen among adults. In comparison, the FiDIP approach shows noticeably better results in both Test100 and Test500. It can be seen that pre-trained SOTA human pose models are not universally effective, and infant pose estimation can be The FiDIP model has greatly improved its performances over its initial Pose-ResNet model by being fine-tuned with augmented dataset. FiDIP pose estimation accuracy tested on SyRIP Test100 is as high as 90.1 in mAP. Note that the SyRIP test dataset only contains 100 single-infant images, while the COCO val2017 dataset has about 5000 images with single or multiple people. So in theory, if a pose estimator is generalizable, it should also perform well on the SyRIP test dataset, which is the case for the Pose-ResNet and DarkPose models. However, it was observed that mAP of Faster R-CNN models and one of the DarkPose models with 128×96 input size are much lower on the infant test dataset than the COCO dataset. These results show that the generalization of these two pose estimators is not high enough, and they are not robustly adapted to other pose-specific datasets.

Figure 2:
FIG. 2 shows samples of infant pose prediction results. The 1st column is the visualization of groundtruth. Comparative results were obtained using DarkPose-mAP:65.9 (2nd column from left), FasterR-CNN-mAP:70.1 (3rd column), Pose-ResNet-mAP:82.4 (4rd column), DarkPose-mAP:88.4 (5th column), and FiDIP-mAP:90.1 (6th column, the technology described herein) on the dataset SyRIP Test100. The performance comparisons are listed in Table 2. Incorrect predictions are bordered by an ellipse.

Also provided are qualitative visualizations of the FiDIP network on the SyRIP test dataset compared with the Faster R-CNN, DarkPose, and Pose-ResNet models performance in FIG. 2. Simple poses, such as the examples in the 1st row of FIG. 2, were predicted accurately by almost all of the SOTA models. However, in infant's daily activities, their poses are often varied and more complex, especially in their lower body. Dark-Pose model based on ResNet-50 with 128×96 input size (2nd column) and Faster R-CNN model based on ResNet-50 (3rd column) trained on the adult datasets, show clear inaccuracies in localizing the position of infant's legs and feet. Even Pose-ResNet and DarkPose based on HRNet models with 384×288 input size were unable to keep a high performance of infant lower body estimation. FiDIP had a much greater chance of inferring keypoints correctly for infant pose images than other models as shown in FIG. 2.

Figure 9:
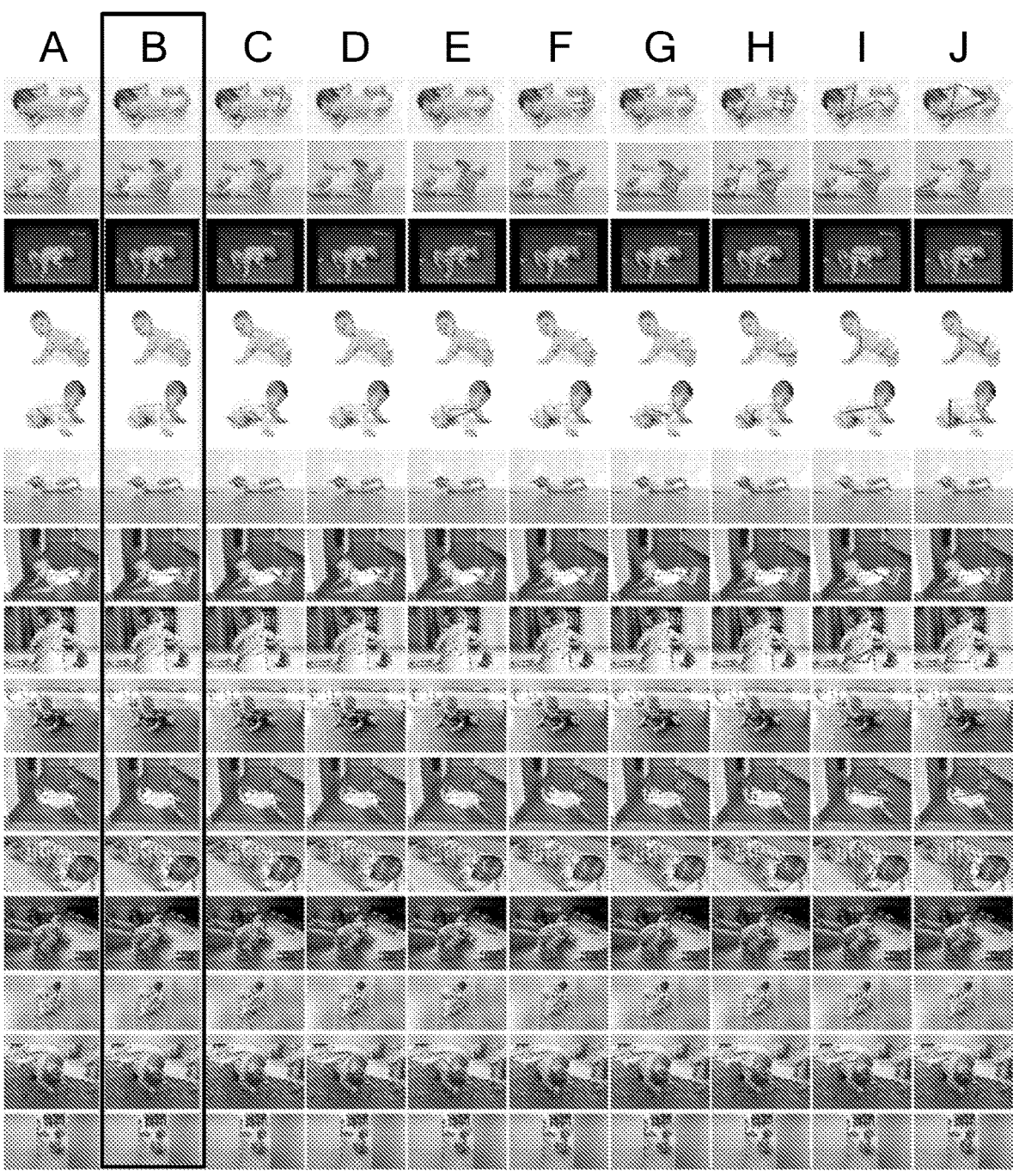
FIG. 9 illustrates samples of infant pose prediction results of SOTA models on the SyRIP Test500 dataset, which are listed in Table 2.

In FIG. 9, more visualized results for the FiDIP approach are compared with the other well-performed pose estimation models (where their AP is higher than 90.0 on SyRIP Test500) listed in Table 1. Although the results are significantly better than those of other models, FiDIP model failed to predict some lower limb joints, as shown in last five columns of FIG. 9, due to limited pose prior information or occlusion issue.

Ablation Study

Table 3 investigates the performance of alternative choices in the FiDIP model trained on different datasets where the Pose-ResNet-50 [Xiao et al., 2018] is also listed as a baseline which employ a same pose estimation work as described herein without the adaptation parts. Among them, method n is the well-performed FiDIP model as reported in Table 2.

TABLE 3

Ablation study of FiDIP on SyRIP Test100 dataset with resolution of 384 × 288. DC stands for domain classifier. Pose-ResNet-50 Xiao et al. [2018] is provided here for a baseline comparison.

| Method | Training Data | Domain Adaptation | Pre-train DC | Update Layers | SyRIP Test-AP |
|---|---|---|---|---|---|
| Pose-ResNet-50 | — | — | — | — | 82.4 |
| a | 1000 Syn | X | — | Res 4, 5 | 84.1 |
| b | 1000 Syn | X | — | Res 5 | 85.3 |
| c | 1000 Syn | ✓ | X | Res 4, 5 | 84.6 |
| d | 1000 Syn | ✓ | ✓ | Res 4, 5 | 85.3 |
| e | 1000 Syn | ✓ | X | Res 5 | 86.3 |
| f | 1000 Syn | ✓ | ✓ | Res 5 | 85.5 |
| g | 200 Real | X | — | Res 4, 5 | 87.1 |
| h | 200 Real | X | — | Res 5 | 86.9 |
| i | 1200 R + S | X | — | Res 4, 5 | 89.7 |
| j | 1200 R + S | X | — | Res 5 | 89.4 |
| k | 1200 R + S | ✓ | X | Res 4, 5 | 88.7 |
| l | 1200 R + S | ✓ | ✓ | Res 4, 5 | 89.7 |
| m | 1200 R + S | ✓ | X | Res 5 | 89.6 |
| n | 1200 R + S | ✓ | ✓ | Res 5 | 90.1 |

Syrip Datasets.

Table 3 results show that by using the pre-trained the baseline model Pose-ResNet-50 [Xiao et al., 2018], the mAP is only 82.4. With only the synthetic part of SyRIP, the basic fine tuning configuration a can already improve the performance to 84.5. The real section of SyRIP improves the fine tuning even more to 87.1. By combining both real and synthetic together, the highest performance reaches to 90.1. The infant data holds specific distribution and a pre-trained model which is supposed to solve the general human pose estimation problem does not always work for all contexts. The SyRIP dataset can provide the necessary data to further enhance the existing model for infant pose estimation.

Domain Adaptation.

Figure 4A:
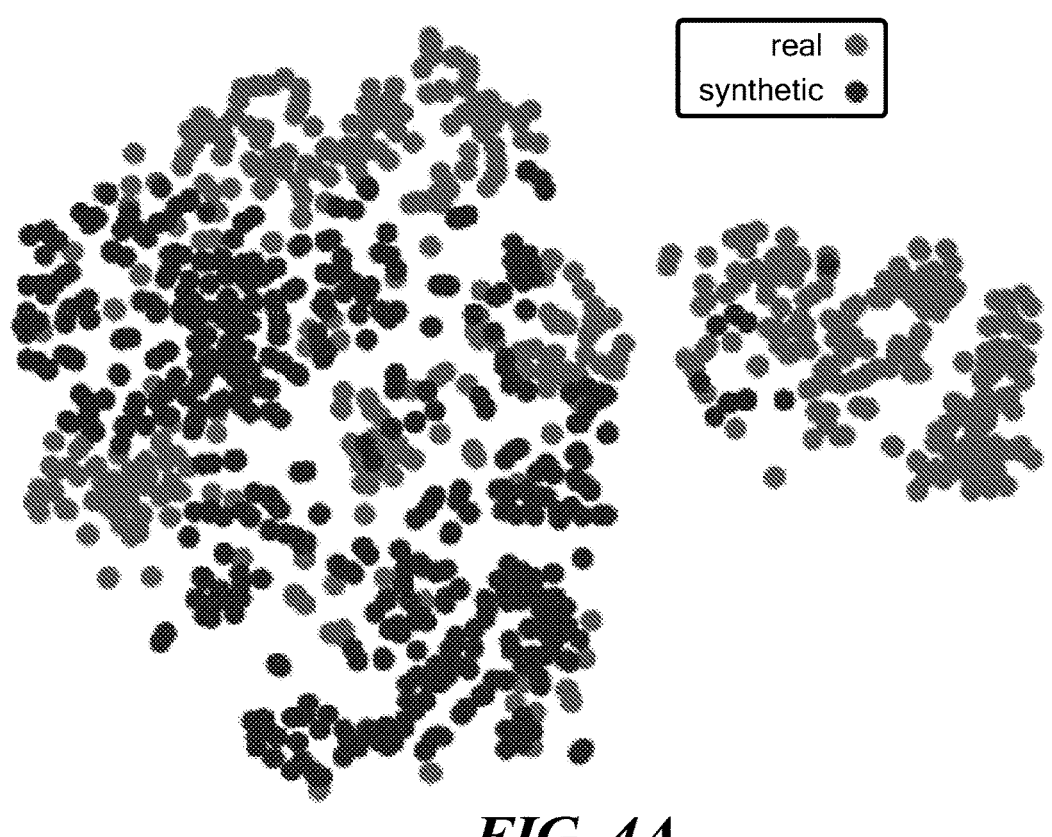
FIG. 4A shows t-SNE (Maaten & Hinton, 2008) visualizations of real and synthetic extracted features for an original Pose-ResNet (Xiao, et al., 2018) method.
Figure 4B:
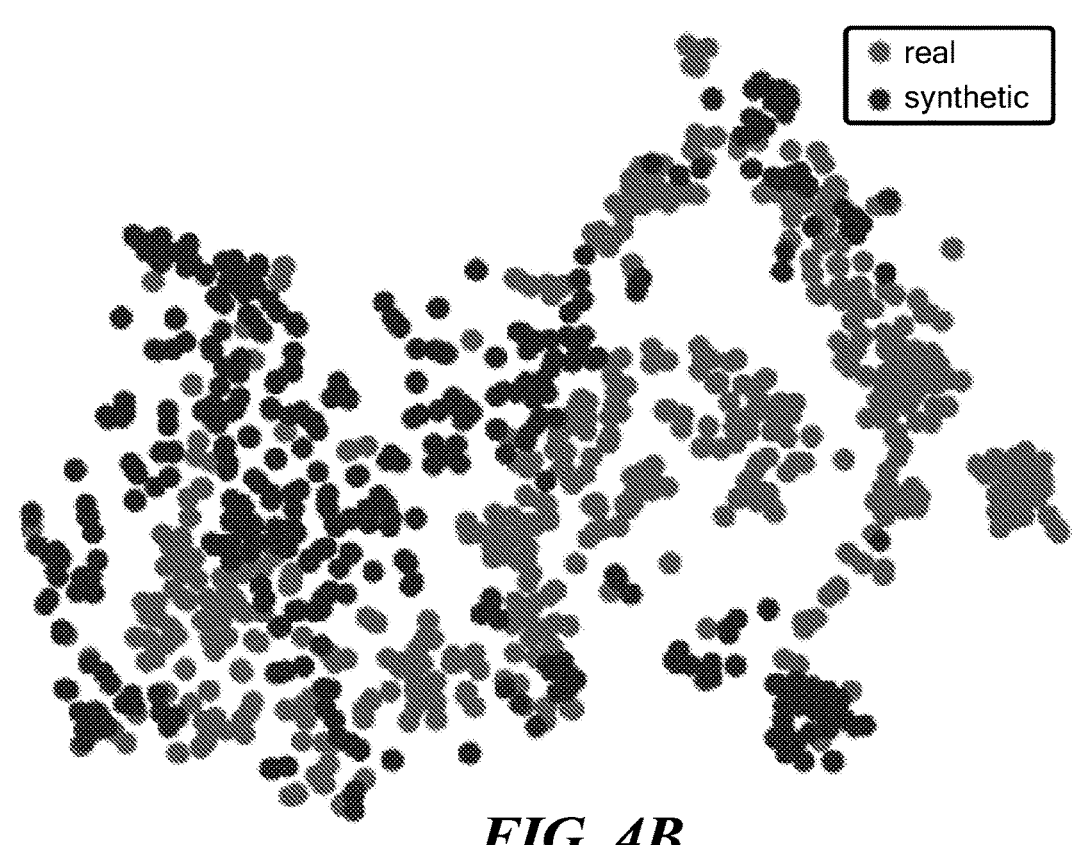
FIG. 4B shows t-SNE visualizations of real and synthetic extracted features for the method j (fine-tuning without domain adaptation, Table 3).
Figure 4C:
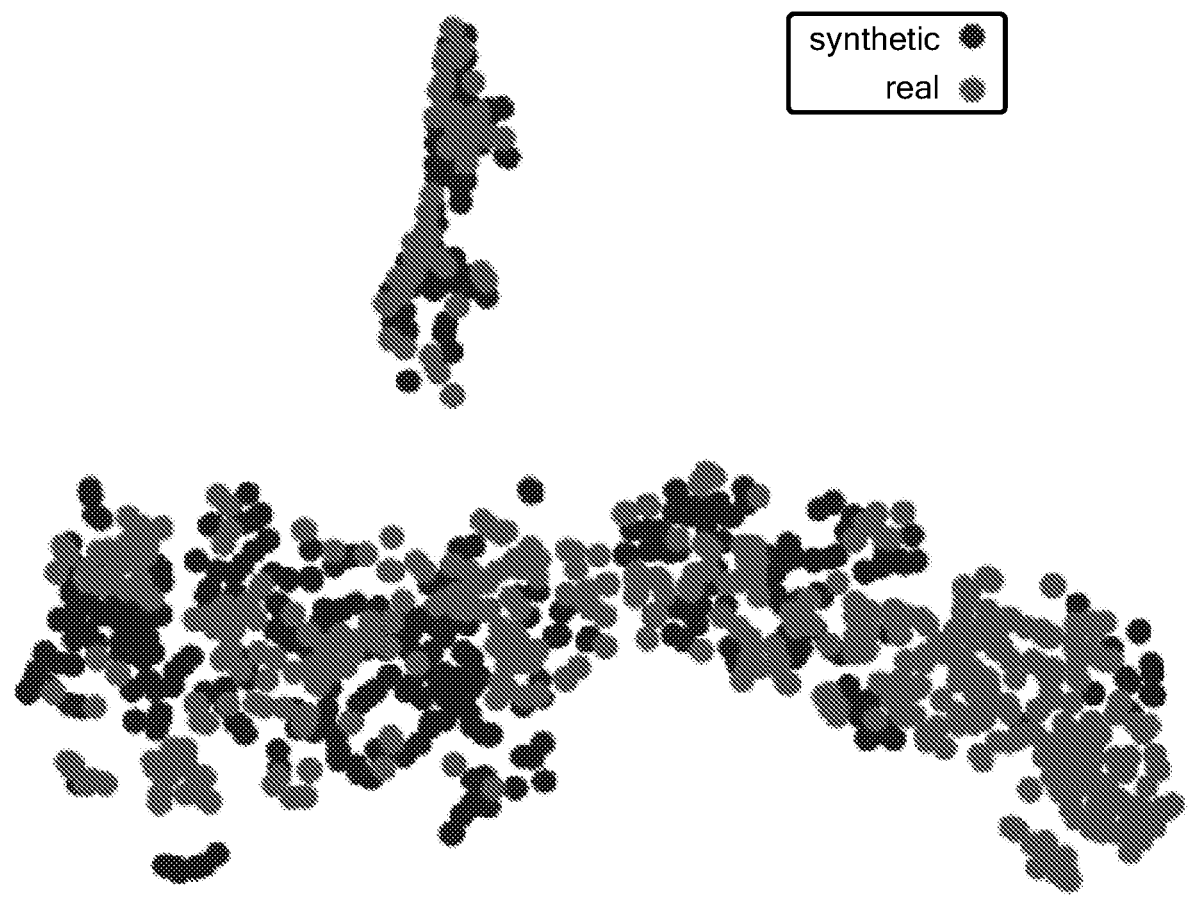
FIG. 4C shows t-SNE visualizations of real and synthetic extracted features for the method n (fine-tuning with domain adaptation) on the SyRIP dataset.

Whether the domain adaptation method as implemented herein can effectively overcome the difference between feature spaces of the real (R) domain and synthetic (S) domain in the SyRIP training dataset was explored, so 500 real images and 500 synthetic images were randomly selected from the whole SyRIP dataset (1200 training+500 testing) for easier observation. Methods that contain domain adaptation show higher AP than other methods without domain adaption. t-SNE [Maaten and Hinton, 2008] was used to visualize the distributions of extracted features for original Pose-ResNet, method j, and method n in FIGS. 4A-4C. As can be seen, the FiDIP network embedded with domain adaptation can align the feature distribution more successfully than other networks.

Figure 5A:
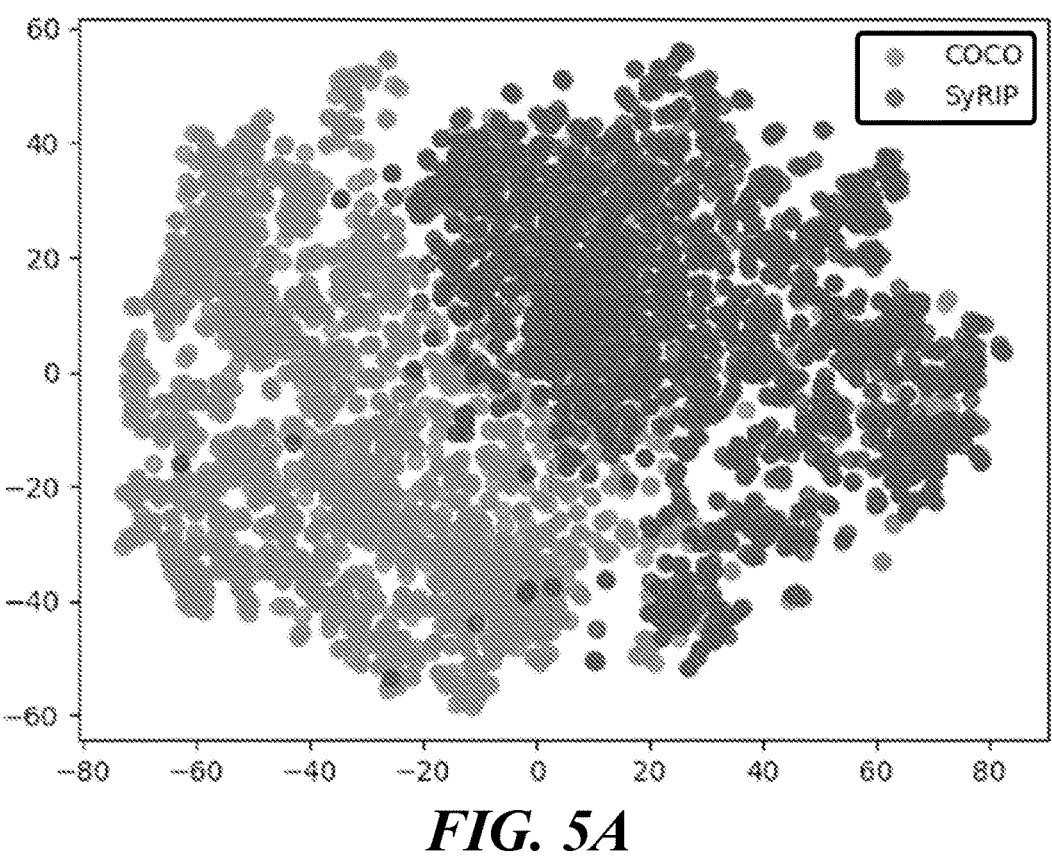
FIG. 5A shows t-SNE visualized features of 700 random samples of COCO Val2017 (Lin, et al., 2014) versus 700 real images of SyRIP.
Figure 5B:
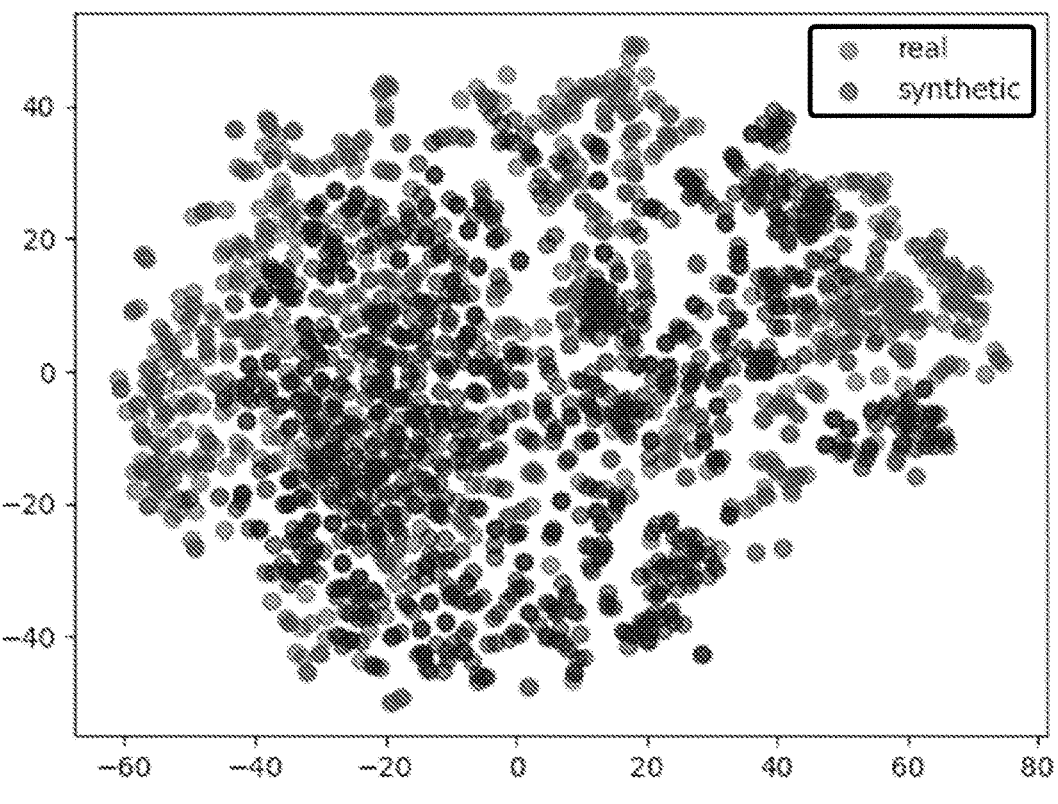
FIG. 5B shows t-SNE visualized features of 1000 synthetic images versus 700 real images of the SyRIP dataset extracted by original SimpleBaseline-50.
Figure 5C:
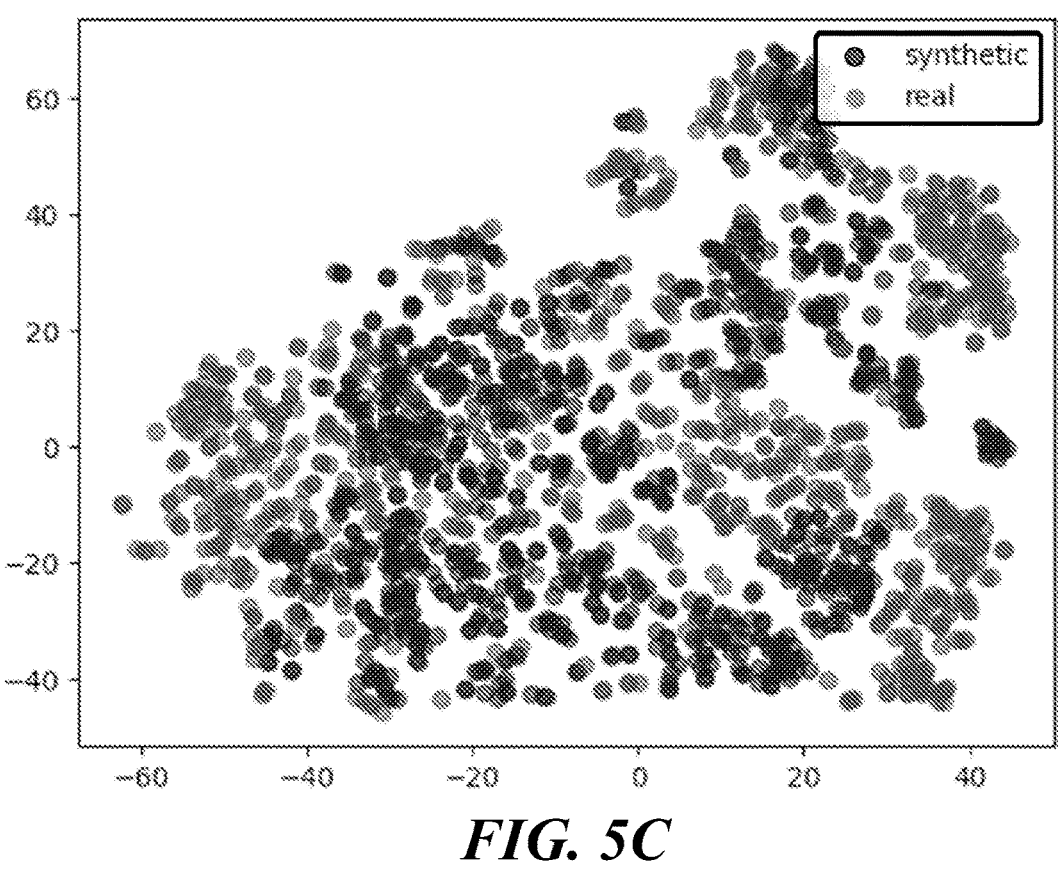
FIG. 5C shows t-SNE visualized features of 1000 synthetic images versus 700 real images of the SyRIP dataset extracted by method i (fine-tuning without domain adaptation).
Figure 5D:
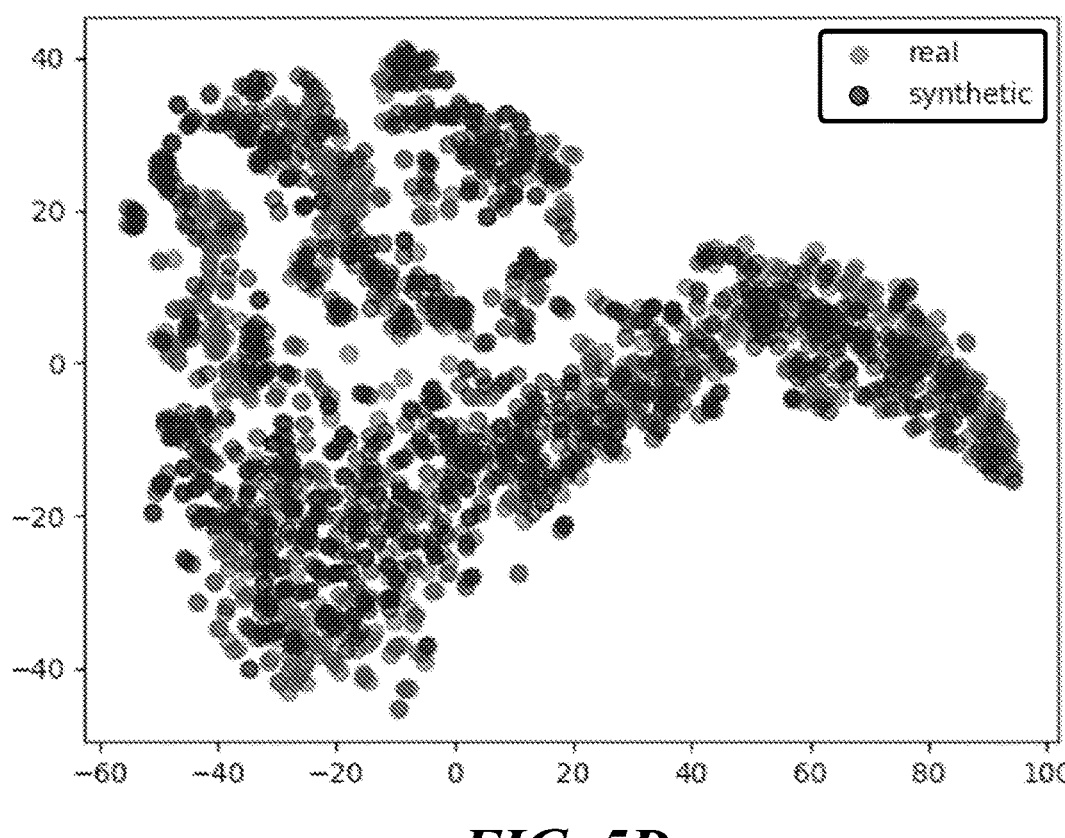
FIG. 5D shows t-SNE visualized features of 1000 synthetic images versus 700 real images of the SyRIP dataset extracted by method n (fine-tuning with domain adaptation).

Further testing on 700 real images and 1000 synthetic images from the whole SyRIP dataset (1200 training+500 testing) was conducted for easier observation. The t-SNE was used to visualize the distributions of extracted features for original SimpleBaseline-50 (FIG. 5B), method i (FIG. 5C), and method n (FIG. 5D). FIG. 5B shows visualized features of 1000 synthetic images versus 700 real images of the SyRIP dataset extracted by original SimpleBaseline-50. FIG. 5C shows visualized features of 1000 synthetic images versus 700 real images of the SyRIP dataset extracted by method i (fine-tuning without domain adaptation). FIG. 5D shows visualized features of 1000 synthetic images versus 700 real images of the SyRIP dataset extracted by method n (fine-tuning with domain adaptation). Methods that contain domain adaptation show higher AP than other methods without domain adaption.

Update Layers.

Freezing weights of the first few layers of the pre-trained network is a common practice when fine-tuning network with an insufficient amount of training data. The first few layers are responsible to capture universal features like curves and edges, so they are fixed to enforce the network to focus on learning dataset-specific features in the subsequent layers at Stage II. The effect of updating different numbers of last few layers of network on the performance of the trained model was explored. In Table 3, for method k and l, the ResNet 4th and 5th blocks of the feature extractor (ResNet-50) were updated, while the first four ResNet blocks were fixed and only the weights of the last one block were updated in methods m and n. It can be observed that methods m and n performed much better than the other two.

Comparison with Direct Fine-Tuning.

A classical approach for transfer learning is a straightforward fine-tuning. Here, three SOTA backbones were employed for pose estimation models with varying complexity, Pose-MobileNet, DarkPose, and SimpleBaseline, and compared to the FiDIP version and a fine-tuned version head to head with results shown in Table 4. To achieve pose estimation goal on backbone MobileNetV2, the Pose-MobileNet was built by adding a pose regressor as a decoder behind MobileNetV2. It was initially trained on COCO Train2017 to get a pre-trained model and then fine-tuned or the FiDIP method applied to Pose-MobileNet on the SyRIP dataset.

TABLE 4

Evaluating the generality of the FiDIP method to different SOTA MODELS on the SyRIP
Test100.

| Method | Backbone | Input size | # Params | GFLOPs | AP | AP50 | AP75 | AR | AR50 | AR75 |
|---|---|---|---|---|---|---|---|---|---|---|
| SimpleBaseline | ResNet-50 | 384 × 288 | 32.42M | 20.23 | 82.4 | 98.9 | 92.2 | 83.8 | 99.0 | 93.0 |
| SimpleBaseline + Finetune | | | | | 90.1 | 98.5 | 97.2 | 91.6 | 99.0 | 98.0 |
| SimpleBaseline + FiDIP | | | | | 91.1 | 98.5 | 98.5 | 92.6 | 99.0 | 99.0 |
| DarkPose | HRNet-W48 | 384 × 288 | 60.65M | 32.88 | 88.5 | 98.5 | 98.5 | 90.0 | 99.0 | 99.0 |
| DarkPose + Finetune | | | | | 92.7 | 98.5 | 98.5 | 93.9 | 99.0 | 99.0 |
| DarkPose + FiDIP | | | | | 93.6 | 98.5 | 98.5 | 94.6 | 99.0 | 99.0 |
| Pose-MobileNet | MobileNetV2 | 224 × 224 | 3.91M | 0.46 | 46.5 | 85.7 | 45.6 | 56.2 | 89.0 | 59.0 |
| Pose-MobileNet + Finetune | | | | | 78.9 | 97.2 | 90.6 | 84.2 | 98.0 | 94.0 |
| Pose-MobileNet + FiDIP | | | | | 79.3 | 99.0 | 89.4 | 84.1 | 99.0 | 92.0 |

Best AP for each method is highlighted in bold font.

Complex Poses.

Figure 8:
FIG. 8 shows example visualized results for the SimpleBaseline+FiDIP model compared with the other well-performed pose estimation models, wherein the AP is higher than 90.0 on the SyRIP Test500 dataset as listed in Table 2.

Most infant poses are very different from those of adults. Because of the baby's softer body, the folded poses and occluded joints are more difficult to recognize or predict. Some of these typical poses selected from the SyRIP Test100 (complex poses collection) are shown in FIG. 8.

Quantitative Results.

In FIG. 9, more visualized results for the FiDIP approach are compared with the other well-performed pose estimation models where their AP is higher than 90.0 on SyRIP Test500 as listed in Table 2. Although the results are significantly better than those of other models, the FiDIP model failed to predict some lower limb joints, as shown in the last five columns of FIG. 9, due to limited pose prior information or an occlusion issue.

EXAMPLES

Example 1. Real Infant Image Datasets with
Synthetic Infant Data Augmentation

The MINI-RGBD dataset (Hesse, Bodensteiner, et al., 2018) was the only publicly available image set for infants. The MINI-RGBD dataset provided only 12 synthetic infant models with continuous pose sequences. Besides having simple poses, the MINI-RGBD sequential feature provided small variation in the poses between adjacent frames, and the poses of whole dataset are mainly repeated. The distribution of body poses of the MINI-RGBD dataset is shown at the bottom of FIG. 3A, which illustrates (bottom) that the poses in this dataset are simple and lack variations.

Figure 3B:
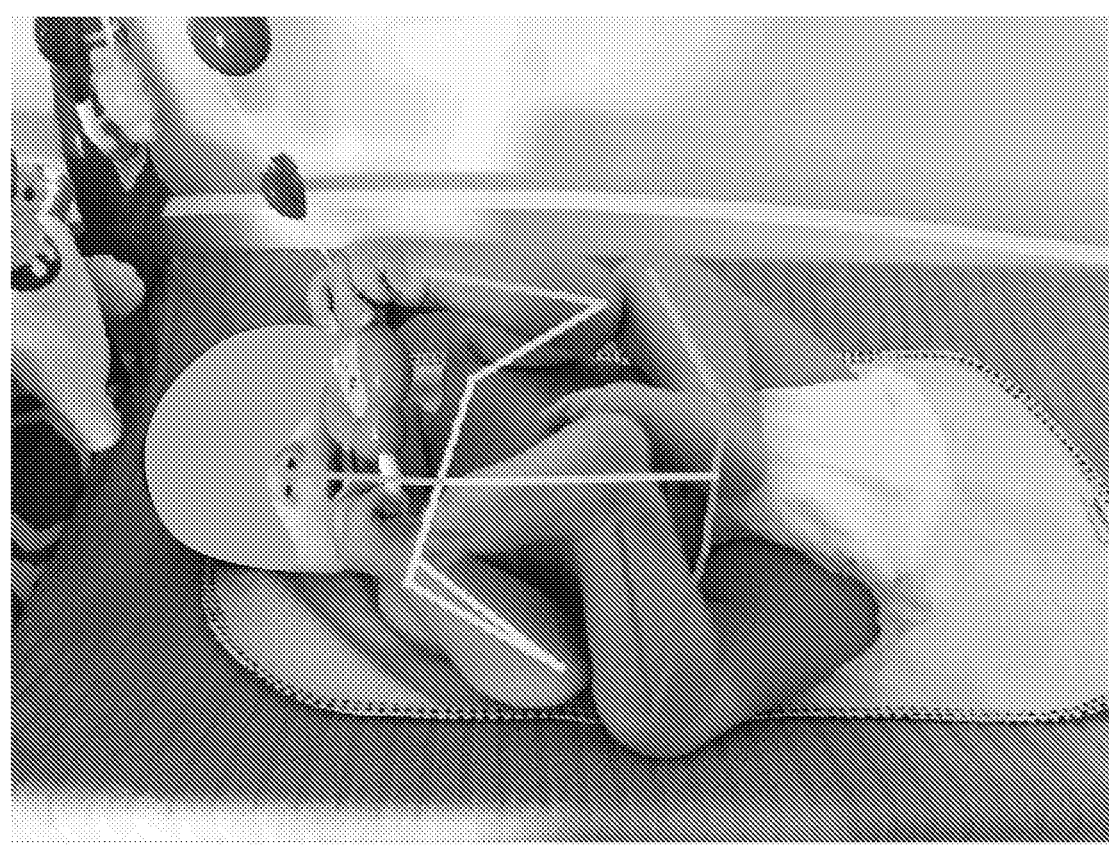
FIG. 3B shows a sample image (top) and pose distributions (bottom) of the real part of the SyRIP dataset.
Figure 3B:
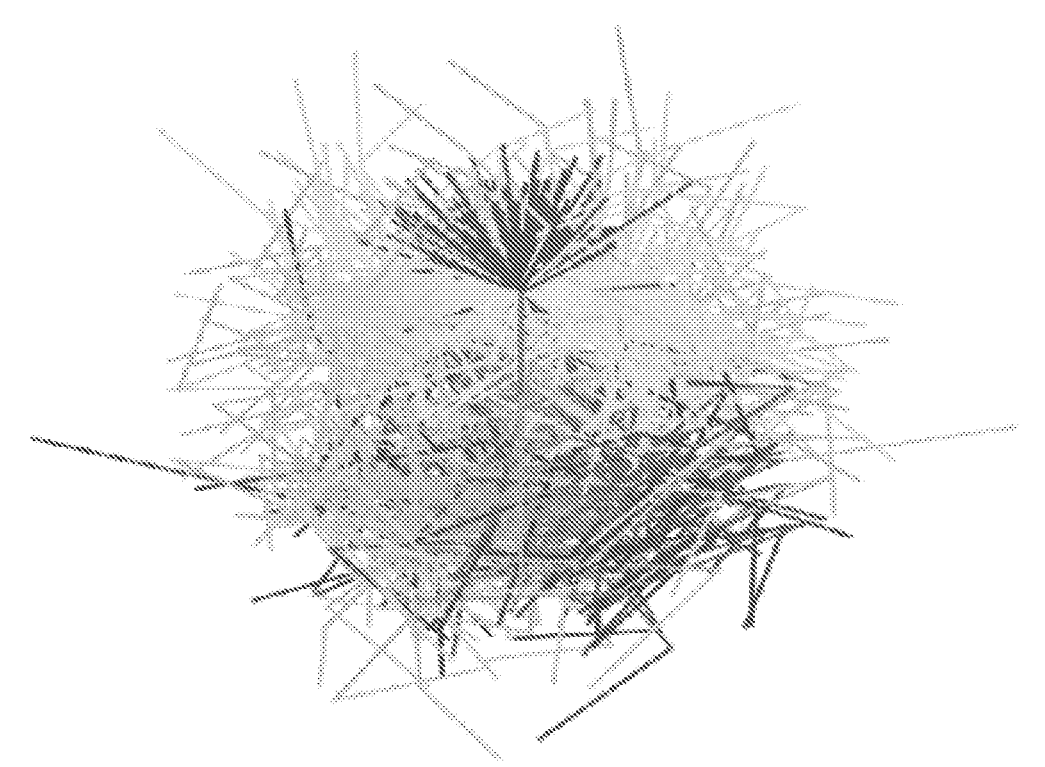
Figure 3C:
FIG. 3C shows a sample image (top) and pose distributions (bottom) of the synthetic part of the SyRIP dataset. In each of FIGS. 3A-3C, the top image shows a sample of each dataset with its groundtruth labels, and the bottom distributions show the pose distribution of 200 images that are randomly selected from each dataset, in which shades of different body parts correspond to the shades of body parts of figures in the top image. For the pose distribution, all images are normalized based on the infant bounding box to scale them into similar sizes, then aligned based on their torso with upward head. To better represent poses, the points for ears and eyes are ignored, and the joints are visualized.
Figure 3C:
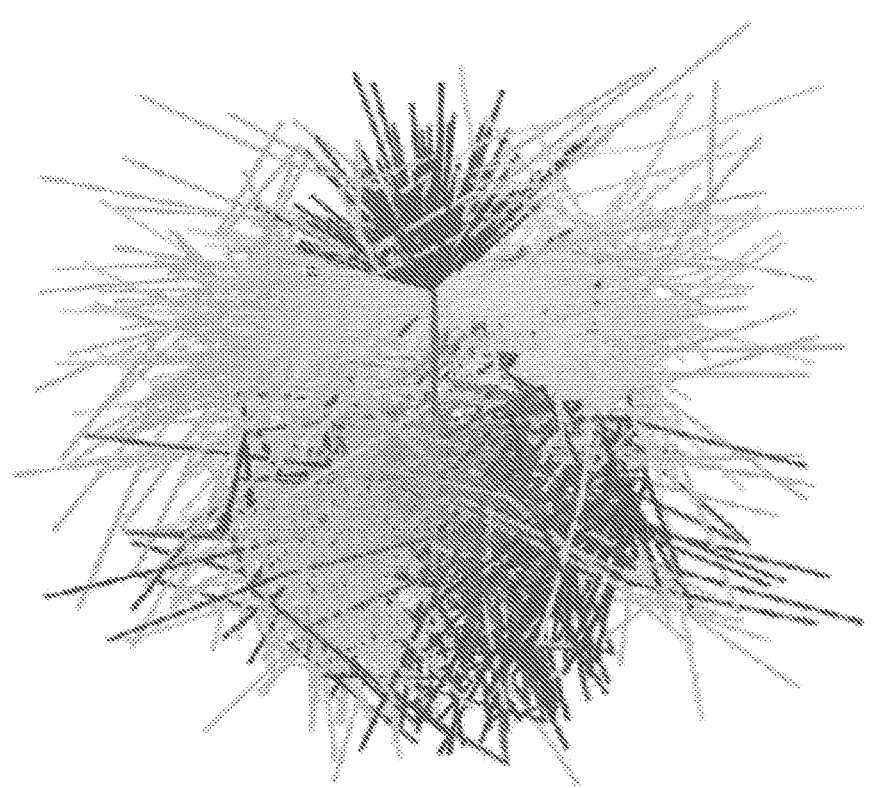

A popular video website (YouTube) and image websites (Google Images) were searched for videos and images of infants at ages newborn to one year old. More than 40 videos with different infants were gathered. Each video was split to pick about 12 frames containing different poses. About 500 images including more than 50 infants with different poses from those frames were collected. Also, about 200 high-resolution images containing more than 90 infants were selected from an image website. Compared to images taken from the videos, images from image websites had higher resolution and could be used to improve the quality of the whole dataset. The pose distribution of the real part of SyRIP dataset is shown in FIG. 3B bottom. The poses in FIG. 3B were more diverse than those in the MINI-RGBD dataset in FIG. 3A bottom.

The about 200 high-resolution images were too small to train a deep neural network and even not enough to fine-tune a pose estimation model with deep structure. A cross domain inspired synthetic augmentation approach was developed for infant pose data simulation. The pipeline of synthetic augmentation is illustrated in FIG. 6. As illustrated at the left of FIG. 6, a SMIL model was employed for synthetic infant image generation. The parameters that were used are described in equation (4) and in section Synthetic Images Generation above.

150 various poses/skeletons were randomly selected from the real images as initial poses. The synthetic infant bodies were generated by fitting the SMIL model to these initial poses. In order to make the dataset as diverse as possible, generated infant bodies were rendered with random textures/clothes and random backgrounds from different viewpoints with some different lights. Since there are very few infant texture resources, to enhance the appearance variance, besides the available 12 infant textures (naked only with diaper) provided by MINI-RGBD dataset, the infant model was further augmented with adult textures from 478 male and 452 female clothing images coming from SURREAL dataset. For the background, 600 scenarios approximately related to infant indoor and outdoor activities were chosen from the LSUN dataset (Yu, et al., 2015). For each initial pose, 10 synthetic images were generated with different global rotations. However, not all poses were fitted correctly. They were manually filtered out, and 950 good quality synthetic infant images were finally retained (samples are shown in 2nd column of FIG. 7) with 480×640 resolution as a part of the synthetic subset.

In order to supply abundant synthetic infant images with manifold poses, several frames from a synthetic 3D infant animation created in the Blender software were also extracted. 950 synthetic infant images were generated by fitting the SMIL model and 50 images were generated with high resolution using Blender to expand the synthetic training portion of the SyRIP dataset. The pose distribution of this synthetic subset is visualized in FIG. 3C.

The AH-COLT was applied to annotate the SyRIP dataset in COCO fashion in three steps: AI labeling, human reviewing, and human revision. First, a set of images as the unlabeled data source was chosen and an already trained Faster R-CNN network as the AI labeler was used to get the initial annotation results and store them in a pickle file. Even though Faster R-CNN gives high accuracy results on adult poses, its annotation outcomes on infant poses were not fully accurate. Therefore, the second step, human review, was done. In this step, AI results could be reviewed, and each joint could be clicked on to mark whether it is an error or correct. After that, the other pickle file that contains all information of all joints (their coordinates, whether they are visible and whether they are correct) was obtained. Finally, using the human reviser interface, a human revised those error joints and clicked the correct points as the new right joints.

The SyRIP dataset included 700 real infant images with representative poses via manual selection and 1000 synthesized infants. For a reliable evaluation, a large portion was kept, 500 images of real infant data as a test set which was called Test500 (for a common test). The other 200 real images with the synthetic infant data were used as the training set. A challenging subset was collected with 100 complex yet typical infant poses from Test500 which was called Test100.

Example 2. Network Architecture and Training

The training dataset described in Example 1 was divided into a pre-training dataset for the model initialization and a stage training dataset for fine-tuning. The pre-training dataset with only real/synthetic labels contained the 1904 samples from the COCO Val2017 dataset and 2000 synthetic adult images from the SURREAL dataset. The performance of the FiDIP network was demonstrated by conducting comparative experiments on the Test100 and Test500 datasets.

An example of components employed as the building blocks for an FiDIP network are shown in FIG. 1. The FiDIP framework was integrable with any existing encoder-decoder pose model. As illustrated in FIG. 1, a pose estimation model with feature extractor as its encoder and pose estimator as its decoder could apply FiDIP by introducing a domain classification head. The entire model could be treated as two sub-networks: a pose estimation network and a domain confusion network. The pose estimation network could be configured with any pose model, for example, including SimpleBaseline (Xiao, et al., 2018), DarkPose (Zhang, et al., 2020), and Hourglass (Newell, et al., 2016). In another example, the pose estimation component included a ResNet-50 backbone (He, et al., 2016) as the encoder and a pose head from Xiao, et al., 2018 as the decoder. The domain confusion network, which includes a feature extractor shared with the pose estimation component and a domain classifier, was added to enforce the images in the real or synthetic domain being mapped into a same feature space after feature extraction. The domain classifier was designed to be a binary classifier with only three fully connected layers to distinguish whether the input feature belongs to a real or synthetic image. In particular, the domain confusion network assisted pose estimation network during training. At test time, only the pure pose model (pose estimation network) works independently. After network design and SyRIP formation, example FiDIP code was eventually made available at [1], and the SyRIP data set was made available at [2].

The FiDIP training procedure included an initialization session and a formal training session where the domain classifier and feature extractor were trained in a circular way.

The pose estimation component of the FiDIP network was pre-trained on adult pose images from the COCO dataset (Lin, et al., 2014) for model initialization. Since the training strategy was based on the use of fine-tuning for transfer learning, to avoid unbalanced components updating during fine-tuning, the domain classifier part of the domain confusion sub-network also needed to be pre-trained on both real and synthetic data from adult humans in advance. This combination dataset included real adult images from the validation part of the COCO dataset and some part of synthetic humans for real (SURREAL) dataset (Varol, et al., 2017). During this pre-training, the feature extractor part stayed frozen, and only the weights for domain classifier were initialized.

After this initialization, Stage I and Stage II of the formal training session were conducted as further described in Example 3 below (also see Network Training above).

Example 3. Evaluation of SyRIP and FiDIP with SOTA

Several SOTA pose estimation structures were employed with varying complexity as a backbone network, including the ResNet-50 of SimpleBaseline (SimpleBaseline-50) (Xiao, et al., 2018), HRNet-W48 of DarkPose (Zhang, et al., 2020) and MobileNetV2 (Sandler, et al., 2018) to reflect the general effect of the FiDIP framework. The domain classifier was added, which has 3 fully connected layers on top of the backbone output features. For DarkPose, the highest resolution branch was chosen. During training, Adam optimizer was employed with a learning rate of 0.001. The batch size and epoch for initialization session were 128 and 1, respectively. While, for the formal training session, there were 100 epochs and 64 images in a batch. During the Stage II, the GRL parameter $\lambda$ was set as 0.0005, and a freeze of the first three layers (Res1, Res2, and Res3) of the feature extractor was done in a detailed ablation study. For an evaluation metric, mean average precision (mAP) (Lin, et al., 2014) was employed over 10 thresholds of the object keypoint similarity (OKS), which is the distance between predicted keypoints and groundtruth keypoints normalized by the scale of the person.

The SyRIP quality was gauged by specifically evaluating the effect of its synthetic data as well as its real and synthetic hybrid data. A comparison of identical models fine-tuned on SyRIP or MINI-RGBD datasets was done to compare their performances as shown in Table 1.

An evaluation over FiDIP was conducted by comparing: (a) FiDIP with SOTA pre-trained models; (b) a FiDIP ablation study; and (c) FiDIP with conventional fine-tuning approach. All models were trained on SyRIP if needed, and a performance advantage purely comes from the approaches.

A comparison with the SOTA general purpose pose estimation models was conducted as follows. The FiDIP model was compared with a ResNet-50 backbone (Xiao, et al., 2018) with pre-trained SOTA approaches as described in Table 2. Most models were well-performed on the SyRIP Test500. For infant-specific poses in dataset Test100, their performance dropped. The FiDIP approach showed better results in both Test100 and Test500. It was found that pre-trained SOTA human pose models are not universally effective, and infant pose estimation could be improved via the FiDIP approach. The pose estimation performance of FiDIP on SyRIP test datasets (Test500 and Test100) and COCO Val2017 dataset were evaluated, and the performance was compared with the widely-used pose estimation models based on Faster R-CNN (Wu, et al., 2019), DarkPose (Zhang, et al., 2020), SimpleBaseline-50 (Xiao, et al., 2018), Unbiased Data Processing for Human Pose Estimation (Huang, et al., 2020), and Regional Multi-Person Pose Estimation (Fang, et al., 2017) algorithms, which were listed in Table 2. The performances of the models became apparently different on the infant typical pose subset, SyRIP Test100.

Qualitative visualizations of the Simple-Baseline+FiDIP model on SyRIP test dataset compared to the Faster R-CNN, DarkPose, and SimpleBaseline models performance were generated (FIG. 2). Simple poses, such as the examples in the 1st row of FIG. 2, were predicted accurately by almost all the SOTA models. In an infant's daily activities, their poses are often varied and more complex, especially in their lower body. DarkPose model based on ResNet-50 with 128×96 input size (2nd column) and Faster R-CNN model based on ResNet-50 (3rd column) trained on the adult datasets, showed obvious inaccuracies in localizing the position of infant's legs and feet. Even SimpleBaseline based on ResNet-50 and DarkPose based on HRNet (Cheng, et al., 2019) models with 384×288 input size were unable to keep high performance of infant lower body estimation. SimpleBaseline+FiDIP had much greater chance of inferring keypoints correctly for infant pose images than other models as illustrated in FIG. 2.

An ablation study (Table 3) investigated the performance of alternative choices of FiDIP on SimpleBaseline-50 (SimpleBaseline based on ResNet-50) model, where method performance trained on different datasets was compared with the SimpleBaseline-50 listed as a baseline in Table 3. In Table 3, method n is the well-performing FiDIP model as reported in Table 2. With only the synthetic part of SyRIP, the basic fine-tuning configuration a improved the performance to 84.1. The real section of SyRIP improved the fine tuning more to 87.1 (g, Table 3). By combining both real and synthetic together, the highest performance reached to 91.1 (n).

The domain adaptation method was tested to determine if it can effectively overcome the difference between feature spaces of the real (R) domain and synthetic (S) domain in the SyRIP training dataset. 500 real images and 500 synthetic images were randomly selected from the whole SyRIP dataset (1200 training+500 testing). Methods that contain domain adaptation showed higher AP than other methods without domain adaption. The t-SNE was used to visualize the distributions of extracted features for an original Pose-ResNet, method j, and method n in FIGS. 4A-4C. Further testing on 700 real images and 1000 synthetic images from the whole SyRIP dataset (1200 training+500 testing) was conducted. The t-SNE was used to visualize the distributions of extracted features for original SimpleBaseline-50 (FIG. 5B), method i (FIG. 5C), and method n (FIG. 5D). Methods that contain domain adaptation showed higher AP than other methods without domain adaption.

An exploration of the effect of updating different numbers of last few layers of network on the performance of the trained model was conducted. In Table 3, for method m and n, the ResNet 4th and 5th blocks of the feature extractor (ResNet-50) were updated, while the first four ResNet blocks were fixed and only the weights of last one block are updated in method k and l. It was observed that methods m, n perform much better than the other two.

For comparison with direct fine-tuning, three SOTA backbones were employed for pose estimation models with varying complexity, Pose-MobileNet, DarkPose, and SimpleBaseline, and compare FiDIP version and fine-tuned version head to head with results shown in Table 4. To achieve pose estimation goal on backbone MobileNetV2, the Pose-MobileNet is built by adding a pose regressor as a decoder behind MobileNetV2. It is initially trained on COCO Train2017 to get a pre-trained model and then fine-tune or apply FiDIP method to Pose-MobileNet on SyRIP dataset.

The generality of the FiDIP method to different SOTA models on the Sy RIP Test100 was summarized in the data in Table 4. With identical network structure, the models trained on the SyRIP dataset showed noticeable improvement over the models trained on the only other public infant pose datasets. Integrated with pose estimation backbone networks with varying complexity, FiDIP performed consistently better than the fine-tuned versions of those models. One of the best infant pose estimation performers on the SOTA DarkPose+FiDIP model showed mean average precision (mAP) of 93.61 (Table 4).

CONCLUSION

The technology described herein provides a solution towards robust infant pose estimation which includes an infant dataset SyRIP with hybrid real and synthetic data and a FiDIP network to transfer learn from existing adult models and datasets. The FiDIP model includes a pose estimation sub-network to leverage transfer learning from a pre-trained adult pose estimation network and a domain confusion sub-network for adapting the model to both real infant and synthetic infant datasets. This produced model achieved much better results on the infant test dataset than other SOTA pose estimation models with AP as high as 90.1.

The technology can be used as part of an ecosystem in which, through a combination of unobtrusive sensors that blend seamlessly into the life of (expecting) mothers and infants as well as intelligent machine learning powered software, offer new parents a comprehensive view of the life of their infant child. Furth components of this ecosystem include additional sensing modalities that parents can integrate into secure, privacy-preserving, cloud-enabled, ubiquitous infant activity monitoring capabilities. The current computer vision based baby pose and activity monitoring system utilizes datasets and technology in achieving highly precise infant and baby pose estimates from vision sensors.

REFERENCES

A. Newell, K. Yang, and J. Deng. Stacked hourglass networks for human pose estimation. In European conference on computer vision, pages 483-499. Springer, 2016.

X. Huang, B. Rezaei, and S. Ostadabbas. Ah-colt: an ai-human co-labeling toolbox to augment efficient groundtruth generation. In 2019 IEEE 29th International Workshop on Machine Learning for Signal Processing (MLSP), pages 1-6, IEEE, 2019.

Hao-Shu Fang, Shuqin Xie, Yu-Wing Tai, and Cewu Lu. RMPE: Regional multi-person pose estimation. In ICCV, 2017.

Yaroslav Ganin and Victor Lempitsky. Unsupervised domain adaptation by backpropagation. In *International conference on machine learning*, pages 1180-1189. PMLR, 2015.

Mijna Hadders-Algra, Annekt W J Klip Van den Nieuwendijk, Albert Maitijn, and Leo A van Eykern. Assessment of general movements: towards a better understanding of a sensitive method to evaluate brain function in young infants. *Developmental Medicine & Child Neurology*, 39(2): 88-98, 1997.

Kaiming He, Xiangyu Zhang, Shaoqing Ren, and Jian Sun. Deep residual learning for image recognition. In *Proceedings of the IEEE conference on computer vision and pattern recognition*, pages 770-778, 2016.

Nikolas Hesse, A Sebastian Schröder, Wolfgang Müller-Felber, Christoph Bodensteiner, Michael Arens, and Ulrich G Hofmann. Body pose estimation in depth images for infant motion analysis. In 2017 39th *Annual International Conference of the IEEE Engineering in Medicine and Biology Society (EMBC)*, pages 1909-1912. IEEE, 2017.

Nikolas Hesse, Christoph Bodensteiner, Michael Arens, Ulrich G Hofmann, Raphael Weinberger, and A Sebastian Schroeder. Computer vision for medical infant motion analysis: State of the art and rgb-d data set. In *Proceedings of the European Conference on Computer Vision (ECCV)*, pages 0-0, 2018.

Nikolas Hesse, Sergi Pujades, Javier Romero, Michael J Black, Christoph Bodensteiner, Michael Arens, Ulrich G Hofmann, Uta Tacke, Mijna Hadders-Algra, Raphael Weinberger, et al. Learning an infant body model from rgb-d data for accurate full body motion analysis. In *International Conference on Medical Image Computing and Computer-Assisted Intervention*, pages 792-800. Springer, 2018.

Junjie Huang, Zheng Zhu, Feng Guo, and Guan Huang. The devil is in the details: Delving into unbiased data processing for human pose estimation. In *The IEEE CVF Conference on Computer Vision and Pattern Recognition (CVPR)*, June 2020.

Tsung-Yi Lin, Michael Maire, Serge Belongie, James Hays, Pietro Perona, Deva Ramanan, Piotr Dollár, and C Lawrence Zitnick. Microsoft coco: Common objects in context. In *European conference on computer vision*, pages 740-755. Springer, 2014.

Shuangjun Liu and Sarah Ostadabbas. A vision-based system for in-bed posture tracking. In *Proceedings of the IEEE International Conference on Computer Vision Workshops*, pages 1373-1382, 2017.

Shuangjun Liu and Sarah Ostadabbas. A semi-supervised data augmentation approach using 3d graphical engines. *European Conference on Computer Vision*, pages 395-408, 2018.

Liqian Ma, Xu Jia, Qianru Sun, Bernt Schiele, Tinne Tuytelaars, and Luc Van Gool. Pose guided person image generation. In *Advances in neural information processing systems*, pages 406-416, 2017.

Laurens van der Maaten and Geoffrey Hinton. Visualizing data using t-sne. *Journal of machine learning research*, 9(Nov): 2579-2605, 2008.

Heinz F Prechtl. Qualitative changes of spontaneous movements in fetus and preterm infant are a marker of neurological dysfunction. *Early human development*, 1990.

Helge Rhodin, Mathieu Salzmann, and Pascal Fua. Unsupervised geometry-aware representation for 3d human pose estimation. In *Proceedings of the European Conference on Computer Vision (ECCV)*, pages 750-767, 2018.

Hao Su, Charles R Qi, Yangyan Li, and Leonidas J Guibas. Render for cnn: Viewpoint estimation in images using cnns trained with rendered 3d model views. *Proceedings of the IEEE International Conference on Computer Vision*, pages 2686-2694, 2015.

Gul Varol, Javier Romero, Xavier Martin, Naureen Mahmood, Michael J Black, Ivan Laptev, and Cordelia Schmid. Learning from synthetic humans. In *Proceedings of the IEEE Conference on Computer Vision and Pattern Recognition*, pages 109-117, 2017.

Kathan Vyas, Rui Ma, Behnaz Rezaei, Shuangjun Liu, Michael Neubauer, Thomas Ploetz, Ronald Oberleitner, and Sarah Ostadabbas. Recognition of atypical behavior in autism diagnosis from video using pose estimation over time. In 2019 *IEEE 29th International Workshop on Machine Learning for Signal Processing (MLSP)*, pages 1-6. IEEE, 2019.

Yuxin Wu, Alexander Kirillov, Francisco Massa, Wan-Yen Lo, and Ross Girshick. Detectron2. https://github.com/facebookresearch/detectron2, 2019.

Bin Xiao, Haiping Wu, and Yichen Wei. Simple baselines for human pose estimation and tracking. In *Proceedings of the European conference on computer vision (ECCV)*, pages 466-481, 2018.

Feng Zhang, Xiatian Zhu, Hanbin Dai, Mao Ye, and Ce Zhu. Distribution-aware coordinate representation for human pose estimation. In *Proceedings of the IEEE CVF Conference on Computer Vision and Pattern Recognition*, pages 7093-7102, 2020.

Lonnie Zwaigenbaum, Susan Bryson, and Nancy Garon. Early identification of autism spectrum disorders. *Behavioural brain research*, 251:133-146, 2013.

Georgios Pavlakos, Vasileios Choutas, Nima Ghorbani, Timo Bolkart, Ahmed A A Osman, Dimitrios Tzionas, and Michael J Black. Expressive body capture: 3d hands, face, and body from a single image. In *Proceedings of the IEEE Conference on Computer Vision and Pattern Recognition*, pages 10975-10985, 2019.

Dario Pavllo, Christoph Feichtenhofer, David Grangier, and Michael Auli. 3d human pose estimation in video with temporal convolutions and semi-supervised training. In *Proceedings of the IEEE Conference on Computer Vision and Pattern Recognition*, pages 7753-7762, 2019.

Fisher Yu, Ari Seff, Yinda Zhang, Shuran Song, Thomas Funkhouser, and Jianxiong Xiao. Lsun: Construction of a large-scale image dataset using deep learning with humans in the loop. arXiv preprint arXiv: 1506.03365, 2015.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

What is claimed is:

1. A system for estimating a pose of an infant, the system comprising:
   one or more processors; and
   at least one memory including instructions for a pose estimator, the pose estimator comprising a trained model for estimating infant poses trained on an adult pose dataset and an augmented dataset containing real infant pose data and synthetic infant pose data using domain adaptation to align features of the synthetic infant pose data with the real infant pose data; and
   wherein the at least one memory further includes instructions that, when executed by the one or more processors, cause the system to:
   receive one or more images of an infant transmitted from an imaging device; and
   determine a pose of the infant using the trained model.

2. The system of claim 1 further comprising one or more imaging devices for acquiring images of the infant.

3. The system of claim 1, wherein the augmented dataset is provided by a process comprising:
   fitting infant model pose and shape parameters into a real infant image to form a reposed model, the infant model pose and shape parameters including body joints and shape coefficients; and
   generating synthetic output images as the synthetic infant pose data.

4. The system of claim 3, wherein the synthetic output images are generated by an imaging process as a function of the infant model pose and shape parameters, imaging device parameters, body texture maps, and background images;

wherein the imaging device parameters include principal point and focal length of a camera; and wherein the body texture maps include infant textures from infant clothing images augmented with adult textures from adult clothing images.

5. The system of claim 3, wherein the synthetic output images are augmented by minimizing a cost function, wherein the cost function is a sum of loss terms weighted by imaging device parameters, the loss terms including:

a joint-based data term comprising a distance between ground truth two dimensional joints and a two dimensional projection of corresponding posed three dimensional joints of the infant model pose for each joint;

a mixture of Gaussian pose priors learned from adult poses;

a shape penalty comprising a distance between a shape prior of the infant model and the shape parameters being optimized; and a pose prior penalizing elbows and knees.

6. The system of claim 1, wherein the pose estimator further comprises:

a pose estimation component comprising a feature extractor and a pose predictor; and a domain confusion component in communication with the pose estimation component to share the feature extractor and including a domain classifier operative to distinguish whether a feature on an input image belongs to a real image or synthetic image.

7. The system of claim 6, wherein the pose estimation component further comprises a residual neural network as an encoder and a pose head estimator as a decoder.

8. The system of claim 6, wherein in a first stage, the domain confusion component is fine-tuned using real infant pose data and synthetic infant pose data, to obtain a domain classifier for predicting whether features of an input image are from a synthetic infant image or a real infant image, using an optimization of a loss function to determine a binary cross entropy loss.

9. The system of claim 8, wherein in the first stage, the pose estimation component is locked.

10. The system of claim 9, wherein in a second stage, the pose estimation component is fine-tuned using the domain classifier to extract body keypoint information independently of differences between a real domain and a synthetic domain.

11. The system of claim 10, wherein in the second stage, weight of real data and synthetic data is balanced by maximizing a domain loss function, wherein features representing the real domain and features representing the synthetic domain become more similar.

12. The system of claim 6, wherein the feature extractor and the domain classifier are operative to enforce mapping of input images in a real domain or a synthetic domain into a same feature space after feature extraction.

13. The system of claim 6, wherein the domain classifier comprises a binary classifier with three fully connected layers operative to distinguish whether an input feature belongs to a real image or a synthetic image.

14. The system of claim 6, wherein the pose estimation component is pre-trained with real adult data, and the domain confusion component is pre-trained with real adult data and synthetic adult data.

15. The system of claim 2, wherein the one or more imaging devices are selected from a video camera, a motion capture device, a red-green-blue (RGB) camera, a long-wavelength infrared (LWIR) imaging device, and a depth sensor.

16. A method of estimating a pose of an infant comprising:

receiving one or more images of an infant transmitted from an imaging device; and determining a pose or posture of the infant by processing the one or more images with a pose estimator, wherein the pose estimator includes a trained model for estimating infant poses trained on an adult pose dataset and an augmented dataset containing real infant pose data and synthetic infant pose data using domain adaptation to align features of the synthetic infant pose data with the real infant pose data.

17. The method of claim 16, wherein the one or more images of the infant are captured using the imaging device.

18. The method of claim 16, wherein the augmented dataset is generated by:

fitting infant model pose and shape parameters into a real infant image to form a reposed model, the infant model pose and shape parameters including body joints and shape coefficients, the shape coefficients including representations of height, length, fatness, thinness, and head-to-body ratio; and generating synthetic output images, wherein the synthetic output images are generated by an imaging process as a function of the pose and shape parameters, camera parameters, body texture maps, and background images, the camera parameters including camera principal point and focal length, and the body texture maps including infant textures from infant clothing images augmented with adult textures from adult clothing images.

19. The method of claim 18, wherein the synthetic output images are augmented by minimizing a cost function, wherein the cost function is a sum of loss terms weighted by camera parameters, the loss terms including:

a joint-based data term comprising a distance between ground truth two dimensional joints and a two dimensional projection of corresponding posed three dimensional joints of the infant model pose for each joint;

a mixture of Gaussian pose priors learned from adult poses;

a shape penalty comprising a distance between a shape prior of the infant model and the shape parameters being optimized; and a pose prior penalizing elbows and knees.

20. The method of claim 16, wherein:

the pose estimator comprises:

a pose estimation component including a feature extractor and a pose predictor; and a domain confusion component in communication with the pose estimation component to share the feature extractor and including a domain classifier operative to distinguish whether a feature on an input image belongs to a real image or synthetic image; and wherein the method further comprises:

training the pose estimator in a first stage, wherein the domain confusion component is fine-tuned using real infant pose data and synthetic infant pose data, to obtain a domain classifier for predicting whether features of an input image are from a synthetic infant image or a real infant image, using an optimization of a loss function to determine a binary cross entropy loss;

training the pose estimator in a second stage, wherein the pose estimation component is fine-tuned using the domain classifier to extract body keypoint information independently of differences between a real domain and a synthetic domain; and balancing weights of real data and synthetic data in the second stage by maximizing a domain loss function, wherein features representing the real domain and features representing the synthetic domain become more similar.

21. The method of claim 20, further comprising pre-training the pose estimation component with real adult data, and pre-training the domain confusion component with real adult data and synthetic adult data.

22. The system of claim 3, wherein the shape coefficients include representations of height, length, fatness, thinness, and head-to-body ratio.

* * * * *